(12) United States Patent
Kohashi et al.

(10) Patent No.: US 9,121,601 B2
(45) Date of Patent: Sep. 1, 2015

(54) INSERTION-HOLE BLOCKAGE-RATE EVALUATION SYSTEM, INSERTION-HOLE BLOCKAGE-RATE EVALUATION METHOD, AND INSERTION-HOLE BLOCKAGE-RATE EVALUATION PROGRAM

(75) Inventors: Yuji Kohashi, Tokyo (JP); Naoto Kawase, Tokyo (JP); Kayoko Kawata, Tokyo (JP); Takashi Inagaki, Tokyo (JP); Masaharu Michihashi, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 678 days.

(21) Appl. No.: 13/428,588

(22) Filed: Mar. 23, 2012

(65) Prior Publication Data
US 2013/0101153 A1    Apr. 25, 2013

(30) Foreign Application Priority Data

Oct. 20, 2011    (JP) .................................. 2011-230336

(51) Int. Cl.
| | |
|---|---|
| G06K 9/00 | (2006.01) |
| F22B 1/02 | (2006.01) |
| F22B 37/00 | (2006.01) |
| G01B 11/28 | (2006.01) |
| G01B 7/06 | (2006.01) |
| G01B 7/32 | (2006.01) |
| G01B 11/06 | (2006.01) |
| G21D 1/00 | (2006.01) |
| G21C 17/017 | (2006.01) |

(Continued)

(52) U.S. Cl.
CPC .............. *F22B 1/025* (2013.01); *F22B 37/002* (2013.01); *F28D 7/06* (2013.01); *F28F 9/0131* (2013.01); *G01B 7/06* (2013.01); *G01B 7/32* (2013.01); *G01B 11/06* (2013.01); *G01B 11/28* (2013.01); *G21C 17/017* (2013.01); *G21D 1/006* (2013.01); *Y02E 30/40* (2013.01)

(58) Field of Classification Search
None
See application file for complete search history.

(56) References Cited

U.S. PATENT DOCUMENTS

| | | | |
|---|---|---|---|
| 4,763,274 A * | 8/1988 | Junker et al. ..................... | 702/38 |
| 7,405,558 B2 * | 7/2008 | Wyatt et al. .................... | 324/228 |

(Continued)

FOREIGN PATENT DOCUMENTS

| | | |
|---|---|---|
| FR | 2834341 A1 | 7/2003 |
| JP | 2002-181793 A | 6/2002 |

(Continued)

OTHER PUBLICATIONS

Prusek, T., et al. "Deposit models for tube support plate flow blockage in Steam Generators." Nuclear Engineering and Design 262 (2013): 418-428.*

(Continued)

*Primary Examiner* — Stephen R Koziol
*Assistant Examiner* — Sean Conner
(74) *Attorney, Agent, or Firm* — Westerman, Hattori, Daniels & Adrian, LLP

(57) ABSTRACT

An insertion-hole blockage-rate evaluation system is applied to a heat exchanger that includes a heat transfer tube and a tube support plate having an insertion hole formed therein for inserting the heat transfer tube therethrough. The tube support plate is displayed in a three dimensional manner in an elliptical diagram with a ratio between a long axis and a short axis being in a range from 1.0 to 2.0 inclusive, each of the tube support plates is serially arranged so as not to overlap on each other, and the insertion-hole blockage-rate evaluation system includes an imaging process of color-coding and displaying the diagram displayed in the three-dimensional elliptical shape according to a value of a blockage rate of the insertion hole acquired by checking the blockage rate of the insertion hole.

11 Claims, 17 Drawing Sheets

(51) Int. Cl.
*F28F 9/013* (2006.01)
*F28D 7/06* (2006.01)

(56) References Cited

U.S. PATENT DOCUMENTS

| | | | | |
|---|---|---|---|---|
| 2008/0007257 | A1* | 1/2008 | Wyatt et al. | 324/229 |
| 2009/0173405 | A1* | 7/2009 | Denzler | 138/41 |
| 2010/0183194 | A1* | 7/2010 | Umemura et al. | 382/103 |
| 2011/0022333 | A1* | 1/2011 | Griffith et al. | 702/46 |
| 2011/0241660 | A1* | 10/2011 | Gemma | 324/220 |
| 2012/0002775 | A1* | 1/2012 | Debroise et al. | 376/249 |
| 2013/0092106 | A1* | 4/2013 | Wepfer et al. | 122/367.1 |

FOREIGN PATENT DOCUMENTS

| | | |
|---|---|---|
| JP | 4266223 B2 | 5/2009 |
| JP | 4279287 B2 | 6/2009 |
| JP | 2009-543094 A | 12/2009 |

OTHER PUBLICATIONS

Girard, Sylvain. "Physical and Statistical Models for Steam Generator Clogging Diagnosis." SpringerBriefs in Applied Sciences and Technology ( (2014).*
Lee, Jae Yong, and Hong Deok Kim. "Prediction of SG tube support plate flow area blockage from thermal-hydraulic analysis." (2008).*
European Search Report dated Feb. 22, 2013, issued in corresponding European Patent Application No. 12166180.5.
Extended European Search Report dated May 10, 2013, issued in corresponding European Patent Application No. 12166180.5 (14 pages).
Chatellier, L. et al., "Tube Support Plate Blockage Evaluation with Televisual Examination and Eddy Current Analysis", AIP Conference Proceedings, Jan. 1, 2009, pp. 766-773, XP55022381.
Bodineau, Herve et al., "Tube support plate clogging up of French PWR stem generators", Eurosafe-towards convergence of technical nuclear safety practices in Europe, 26 Jul. 2011, pp. 1-9, XP55022336.

* cited by examiner 17 (17A TO 17G)
TUBE SUPPORT PLATE 17 (17A TO 17G)
TUBE SUPPORT PLATE

S1: INITIAL OPENING AREA (WITHIN CONTOUR)

S2: OPENING AREA OF BLOCKED PORTION (WITHIN CONTOUR)

$$\left[ \text{BLOCKAGE RATE (\%)} \frac{(S1-S2)}{S1} \times 100 \right]$$

[LONG AXIS:SHORT AXIS=1.62:1]

[LONG AXIS:SHORT AXIS=3.0: 1]

INSERTION-HOLE BLOCKAGE-RATE EVALUATION SYSTEM, INSERTION-HOLE BLOCKAGE-RATE EVALUATION METHOD, AND INSERTION-HOLE BLOCKAGE-RATE EVALUATION PROGRAM

FIELD

The present invention relates to an insertion-hole blockage-rate evaluation system, an insertion-hole blockage-rate evaluation method, and an insertion-hole blockage-rate evaluation program.

BACKGROUND

A steam generator used for a pressurized water reactor plant is a heat exchanger including several thousands of heat transfer tubes and a plurality of tube support plates that bundle the heat transfer tubes and have insertion holes formed therein for inserting the heat transfer tubes therethrough. Heat exchange is performed between high-temperature and high-pressure primary cooling water flowing from the reactor into the heat transfer tubes and secondary cooling water flowing outside the heat transfer tubes, and feed water with temperature thereof becoming high due to the heat exchange turns into steam in an upper part of the steam generator and is fed to a steam turbine for power generation.

In a tube support plate, for example, a four-leafed insertion hole (BEC (Broached Egg Crater) hole) is often provided for each heat transfer tube in order to support the heat transfer tube and to distribute the feed water. Chemicals for adjusting the water quality is put in the feed water, and components included in chemicals such as ferrosoferric oxide and water stain may adhere to gaps (portions where an external surface of the heat transfer tube and an internal surface of the BEC hole are away from each other) in the BEC hole to block the flow of the feed water. Therefore, it is desired to evaluate the ratio (blockage rate) of being blocked by scales present in the gaps in the BEC hole and take measures against the blockage such as cleaning as required.

Conventionally, as the method of checking the blockage rate of gaps in a BEC hole, there have been known methods such as a method of taking pictures of a BEC hole by using a CCD (Charge Coupled Device) camera to calculate the blockage rate based on recorded images (see, for example, Patent Literature 1) and a method of estimating the blockage rate based on an eddy current testing signal acquired by using an eddy current testing (ECT). When the method of estimating the blockage rate based on an ECT signal is used, a bobbin-coil eddy-current probe is generally used. An amplitude in a specific direction is measured based on the eddy current testing signal detected by the bobbin-coil eddy-current probe so as to acquire an estimated blockage rate corresponding to the measured amplitude from an evaluation curve.

As a method of evaluating the blockage rate of a BEC hole of a steam generator, first, an actual blockage rate is determined by visual inspection, and an ECT waveform of a gap in a BEC hole at a position (an address) corresponding to the visual inspection is obtained, thereby determining a blockage evaluation value from the ECT waveform. The visual inspection uses an image captured and recorded by the CCD camera or the like. In the present specification, all inspections similar to this visual inspection are described as "visual inspection". Furthermore, the actual blockage rate read from captured images is described below as "actual blockage rate". An evaluation curve is created in advance based on the actual blockage rate measured by the visual inspection and the blockage evaluation value based on the ECT waveform. Thereafter, a blockage evaluation value is calculated based on ECT waveforms of a plurality of BEC holes arbitrarily selected from the entire area of the tube support plate, and an estimated blockage rate of a BEC hole is determined by referring to the evaluation curve.

Furthermore, to assess the accumulated position of deposited materials accumulated on a surface of the heat transfer tube and the accumulated amount thereof, there has been proposed a method of schematically imaging a surface of a heat transfer tube to visually assess an accumulation state of deposited materials on the surface of the heat transfer tube (see, for example, Patent Literature 2).

CITATION LIST

Patent Literatures

Patent Literature 1: Japanese Patent No. 4279287
Patent Literature 2: Japanese Patent Application National Publication No. 2009-543094

SUMMARY

Technical Problem

At the time of creating an evaluation curve, a relation between the blockage rate acquired based on the ECT waveform and the actual blockage rate acquired by visual inspection may be different according to how scales adhere to a BEC hole, and this difference may cause an error. Therefore, to perform a more accurate evaluation of the blockage rate, it is desired to perform visual inspection every time the steam generator is inspected, and to re-create the evaluation curve to decrease an error of the evaluation curve.

However, in the visual inspection, inspection devices such as a video camera need to be placed at an appropriate position within a secondary device of a steam generator. However, an access from outside to the steam generator is limited to a maintenance hatch or the like, and the inside of the steam generator is narrow because of the presence of support plates and heat transfer tubes, and thus the workability is poor. When the visual inspection is performed every time the steam generator is inspected by using the conventional insertion-hole blockage-rate evaluation method described above to re-create the evaluation curve, considerable time and labor are required.

Furthermore, at the time of evaluating the blockage rate of gaps in a BEC hole formed in a tube support plate, the blockage rate of the gaps in the BEC hole in a planar direction of the tube support plate is displayed, for each of a plurality of tube support plates provided in an axial direction of the heat transfer tubes. Therefore, there has been desired an insertion-hole blockage-rate evaluation method of gaps in a BEC hole that can assess a blocked-rate state of the gaps in the BEC hole in the planar direction of each of tube support plates and a blocked-rate state of gaps in the BEC hole in tube support plates provided in the axial direction of heat transfer tubes.

The present invention has been achieved under these circumstances, and an object of the present invention is to provide an insertion-hole blockage-rate evaluation system, an insertion-hole blockage-rate evaluation method, and an insertion-hole blockage-rate evaluation program that can easily assess the blockage rate of an insertion hole of a steam generator.

Solution to Problem

According to an aspect of the present invention, an insertion-hole blockage-rate evaluation system is applied to a heat exchanger that includes a heat transfer tube and a tube support plate having an insertion hole formed therein for inserting the heat transfer tube therethrough, with the insertion hole having a plurality of gaps formed in a circumferential direction thereof when the heat transfer tube is inserted therethrough. The tube support plate is displayed in a three dimensional manner in an elliptical diagram with a ratio between a long axis and a short axis being in a range from 1.0 to 2.0 inclusive, each of the tube support plates is serially arranged so as not to overlap on each other, and the insertion-hole blockage-rate evaluation system includes an imaging process of color-coding and displaying the diagram according to a value of a blockage rate of the insertion hole acquired by checking the blockage rate of the insertion hole.

According to another aspect of the present invention, an insertion-hole blockage-rate evaluation system is applied to a heat exchanger that includes a heat transfer tube and a tube support plate having an insertion hole formed therein for inserting the heat transfer tube therethrough, with the insertion hole having a plurality of gaps formed in a circumferential direction thereof when the heat transfer tube is inserted therethrough, so as to create an evaluation curve based on a blockage rate of the gaps determined by inspection of the insertion hole and a blockage evaluation value of the gaps corresponding to an inspection point. The insertion-hole blockage-rate evaluation system includes: an evaluation-curve updating unit that updates the evaluation curve created at a time of previous check of the blockage rate of the gaps to an evaluation curve close to a blockage rate of the gaps at a time of current check, when the blockage rate of the insertion hole is checked; a blockage-evaluation-value calculating unit that calculates a blockage evaluation value of the gaps in the tube support plate; an estimated-blockage-rate calculating unit that calculates an estimated blockage rate of the gaps based on an updated evaluation curve and the calculated blockage evaluation value; and a blocked-state assessing unit that performs at least one or both of a calculation of an average blockage rate of the gaps and an imaging process of a blocked state based on a calculated estimated blockage rate.

Advantageously, in the insertion-hole blockage-rate evaluation system, inspection for determining a blockage rate of the gaps is visual inspection.

Advantageously, in the insertion-hole blockage-rate evaluation system, an ECT waveform is used for calculating the blockage evaluation value of the gaps.

Advantageously, in the insertion-hole blockage-rate evaluation system, the evaluation-curve updating unit updates an evaluation curve by adding complementary information to an original evaluation curve or the blockage rate of the gaps and the blockage evaluation value of the gaps used for a calculation of the evaluation curve.

Advantageously, in the insertion-hole blockage-rate evaluation system, the evaluation curve has at least one parameter and is a function of one variable, while designating a blockage evaluation value as a variable and an estimated blockage rate as an output, and the evaluation-curve updating unit updates a previous evaluation curve by determining a parameter of the function by an optimization calculation so that an error amount represented by the following equation (1) becomes minimum:

$$\text{the error amount}=\Sigma(Y(i)-f(E(i)))^2+\alpha\cdot\Sigma(Y(j)-f(E(j)))^2 \quad (1),\text{ where}$$

Y: a blockage rate acquired by inspection,
E: a blockage evaluation value,
i: original data of a previous evaluation curve,
f: an evaluation curve and a function of one variable, while designating a blockage evaluation value as a variable and an estimated blockage rate as an output,
α: weighting to an error, and
j: data newly acquired this time.

Advantageously, in the insertion-hole blockage-rate evaluation system, the imaging process uses a mean value of an estimated blockage rate of at least one of the gaps positioned near the gaps as a value of the estimated blockage rate of the gaps.

Advantageously, in the insertion-hole blockage-rate evaluation system, in the imaging process, when there is an omission in information of the estimated blockage rate of the gaps provided in the tube support plate, interpolation is performed by using the estimated blockage rate of the at least one gap positioned near the gaps having an omission.

Advantageously, in the insertion-hole blockage-rate evaluation system, in the imaging process, a predicted estimated blocking speed of the insertion hole is determined from a transition of the estimated blockage rate of the gaps determined by inspections hitherto.

Advantageously, in the insertion-hole blockage-rate evaluation system, the blockage rate of the gaps predicted based on the estimated blocking speed and an operation time until an arbitrary inspection time is added to an estimated blockage rate of the gaps this time, thereby determining an estimated blockage rate of the gaps at the arbitrary inspection time.

According to still another aspect of the present invention, an insertion-hole blockage-rate evaluation method is applied to a heat exchanger that includes a heat transfer tube and a tube support plate having an insertion hole formed therein for inserting the heat transfer tube therethrough, with the insertion hole having a plurality of gaps formed in a circumferential direction thereof when the heat transfer tube is inserted therethrough. The tube support plate is displayed in an elliptical diagram with a ratio between a long axis and a short axis being in a range from 1.0 to 2.0 inclusive, each of the tube support plates is serially arranged so as not to overlap on each other, and the insertion-hole blockage-rate evaluation method includes an imaging process of color-coding and displaying the diagram according to a value of a blockage rate of the insertion hole acquired by checking the blockage rate of the insertion hole.

According to still another aspect of the present invention, an insertion-hole blockage-rate evaluation method is applied to a heat exchanger that includes a heat transfer tube and a tube support plate having an insertion hole formed therein for inserting the heat transfer tube therethrough, with the insertion hole having a plurality of gaps formed in a circumferential direction thereof when the heat transfer tube is inserted therethrough, so as to evaluate blockage of the gaps by using an evaluation curve created based on a blockage rate of the gaps determined by inspection of the insertion hole and a blockage evaluation value of the gaps corresponding to an inspection point. The insertion-hole blockage-rate evaluation method includes: an evaluation-curve updating step of updating the evaluation curve created at a time of previous check of the blockage rate of the gaps to an evaluation curve close to a blockage rate of the gaps at a time of current check, when the blockage rate of the insertion hole is checked; a blockage-evaluation-value calculating step of calculating a blockage evaluation value of the gaps in the tube support plate; an estimated-blockage-rate calculating step of calculating an estimated blockage rate of the gaps based on the calculated blockage evaluation value and the evaluation curve; and a blocked-state assessing step of performing at least one or both of a calculation of an average blockage rate of the gaps and an imaging process of a blocked state based on a calculated estimated blockage rate.

Advantageously, in the insertion-hole blockage-rate evaluation method, visual inspection is used as inspection for determining a blockage rate of the gaps.

Advantageously, in the insertion-hole blockage-rate evaluation method, an ECT waveform is used for calculating the blockage evaluation value of the gaps.

Advantageously, in the insertion-hole blockage-rate evaluation method, the evaluation-curve updating unit updates an evaluation curve by adding complementary information to an original evaluation curve or the blockage rate of the gaps and the blockage evaluation value of the gaps used for a calculation of the evaluation curve.

Advantageously, in the insertion-hole blockage-rate evaluation method, the evaluation curve has at least one parameter and is a function of one variable, while designating a blockage evaluation value as a variable and an estimated blockage rate as an output, and the evaluation-curve updating unit updates a previous evaluation curve by determining a parameter of the function by an optimization calculation so that an error amount represented by the following equation (1) becomes minimum:

$$\text{the error amount} = \Sigma(Y(i) - f(E(i)))^2 + \alpha \cdot \Sigma(Y(j) - f(E(j)))^2 \quad (1), \text{where}$$

Y: a blockage rate acquired by inspection,
E: a blockage evaluation value,
i: original data of a previous evaluation curve,
f: an evaluation curve and a function of one variable, while designating a blockage evaluation value as a variable and an estimated blockage rate as an output,
α: weighting to an error, and
j: data newly acquired this time.

Advantageously, in the insertion-hole blockage-rate evaluation method, the imaging process uses a mean value of an estimated blockage rate of at least one of the gaps positioned near the gaps as a value of the estimated blockage rate of the gaps.

Advantageously, in the insertion-hole blockage-rate evaluation method, in the imaging process, when there is an omission in information of the estimated blockage rate of the gaps provided in the tube support plate, interpolation is performed by using the estimated blockage rate of the at least one gap positioned near the gaps having an omission.

Advantageously, in the insertion-hole blockage-rate evaluation method, in the imaging process, a predicted estimated blocking speed of the insertion hole is determined from a transition of the estimated blockage rate determined by inspections hitherto.

Advantageously, in the insertion-hole blockage-rate evaluation method, the blockage rate of the gaps predicted based on the estimated blocking speed and an operation time until an arbitrary inspection time is added to an estimated blockage rate of the gaps this time, thereby determining an estimated blockage rate of the gaps at the arbitrary inspection time.

According to still another aspect of the present invention, a computer readable medium storing an insertion-hole blockage-rate evaluation program of evaluating blockage of gaps by using a blockage rate of the gaps determined by inspection of an insertion hole, in which a plurality of gaps are formed in a circumferential direction thereof when a heat transfer tube is inserted therethrough. A tube support plate is displayed in an elliptical diagram with a ratio between a long axis and a short axis being in a range from 1.0 to 2.0 inclusive, each of the tube support plates is serially arranged so as not to overlap on each other, and the insertion-hole blockage-rate evaluation program is executed by a computer that performs color-coding and displays the diagram according to a value of a blockage rate of the insertion hole acquired by checking the blockage rate of the insertion hole.

According to still another aspect of the present invention, a computer readable medium storing an insertion-hole blockage-rate evaluation program of creating an evaluation curve based on a blockage rate of gaps determined by inspection of an insertion hole, in which a plurality of gaps are formed in a circumferential direction thereof when a heat transfer tube is inserted therethrough, and a blockage evaluation value of the gaps corresponding to an inspection point, and evaluating blockage of the gaps by using the evaluation curve. The insertion-hole blockage-rate evaluation program causes a computer to perform: an evaluation-curve updating unit that updates the evaluation curve created at a time of previous check of the blockage rate of the gaps to an evaluation curve close to a blockage rate of the gaps at a time of current check, when the blockage rate of the insertion hole is checked; a blockage-evaluation-value calculating process of calculating a blockage evaluation value of the gaps in the tube support plate; an estimated-blockage-rate calculating process of calculating an estimated blockage rate of the gaps based on the calculated blockage evaluation value and the evaluation curve; and a blocked-state assessing process of performing at least one or both of a calculation of an average blockage rate of the gaps and an imaging process of a blocked state based on a calculated estimated blockage rate.

Advantageous Effects of Invention

According to the present invention, the blockage rate of the insertion hole in the steam generator can be easily assessed.

That is, according to the present invention, the tube support plate is schematically displayed in the elliptical diagram with the ratio between the long axis and the short axis of the insertion hole being within a predetermined range, the respective tube support plates are serially arranged so as not to overlap on each other, and the elliptical diagram of the tube support plate is visualized and displayed by color-coding the diagram according to a blockage value of the blockage rate of the insertion hole acquired by checking the blockage rate of the insertion hole. Accordingly, the blocked-rate state of the gaps in the insertion hole in the planar direction of the plurality of tube support plates provided in the axial direction of the heat transfer tubes can be easily assessed simultaneously.

Furthermore, according to the present invention, when the estimated blockage rate of the gaps in the insertion hole is evaluated, the evaluation curve is updated in advance to that close to the latest state by adding interpolated information to the evaluation curve acquired at the time of previous inspections of the estimated blockage rate of the gaps in the insertion hole as a base, and then the estimated blockage rate of the insertion hole to be inspected is calculated. Therefore, a step required for obtaining data for updating the evaluation curve can be reduced, thereby enabling to perform the blockage rate evaluation of the insertion hole in the steam generator easily and with less time and labor. As a result, the cost required for a blockage evaluation of the gaps in the insertion hole can be reduced, and the frequency of the blockage evaluation can be increased.

DESCRIPTION OF EMBODIMENTS

The present invention will be explained below in detail with reference to the accompanying drawings. The present invention is not limited the following embodiment. In addition, constituent elements in the following embodiment include those that can be easily anticipated by persons skilled in the art or that are substantially equivalent.

[Embodiment]

Figure 1:
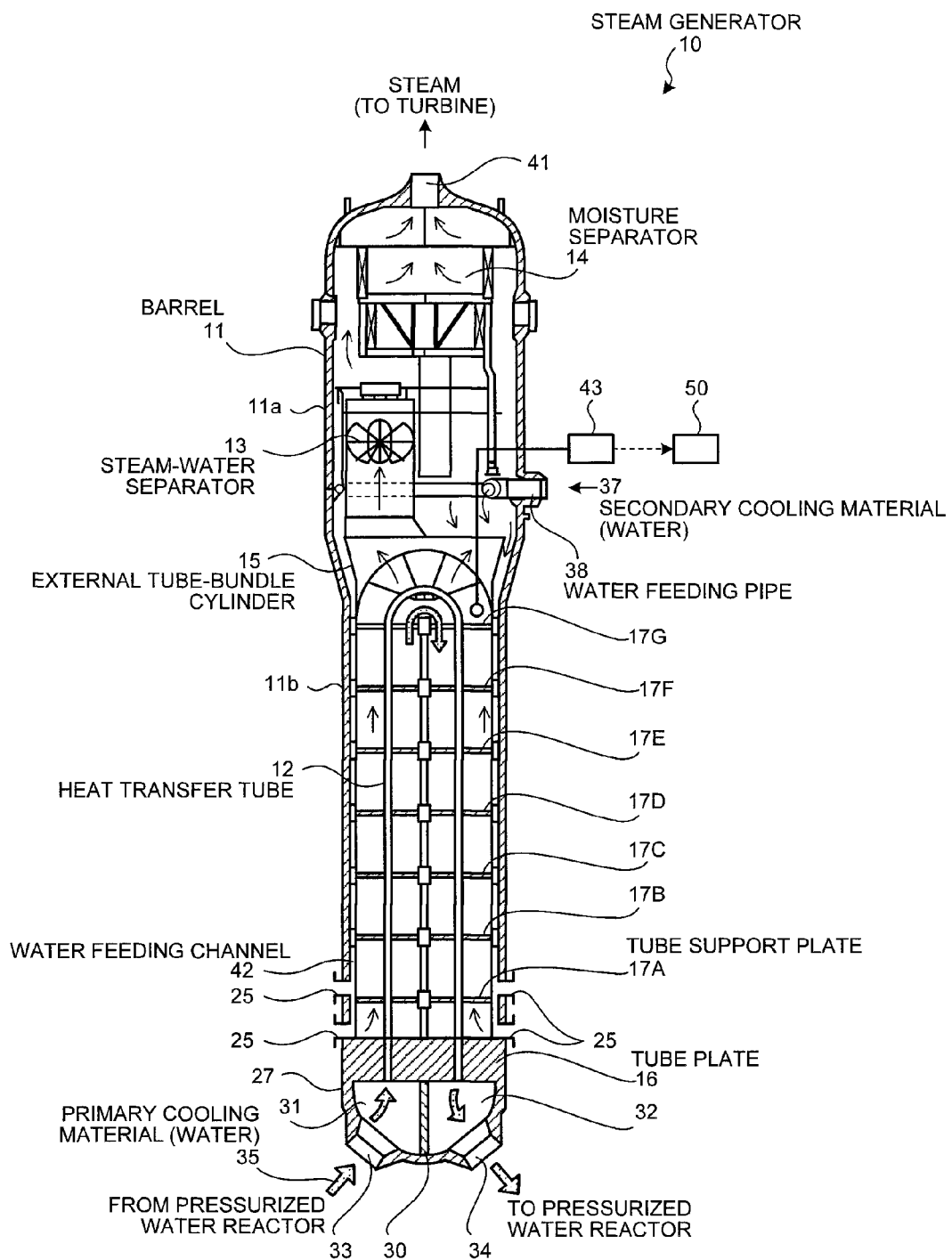
FIG. 1 is an explanatory diagram of a configuration of a steam generator in a nuclear power plant.
Figure 2:
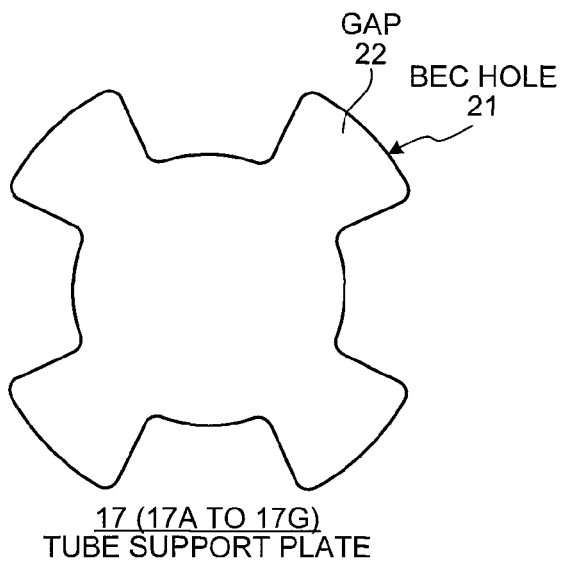
FIG. 2 is a sectional view of a hole of a tube support plate as viewed from an axial direction of a heat transfer tube.
Figure 3:
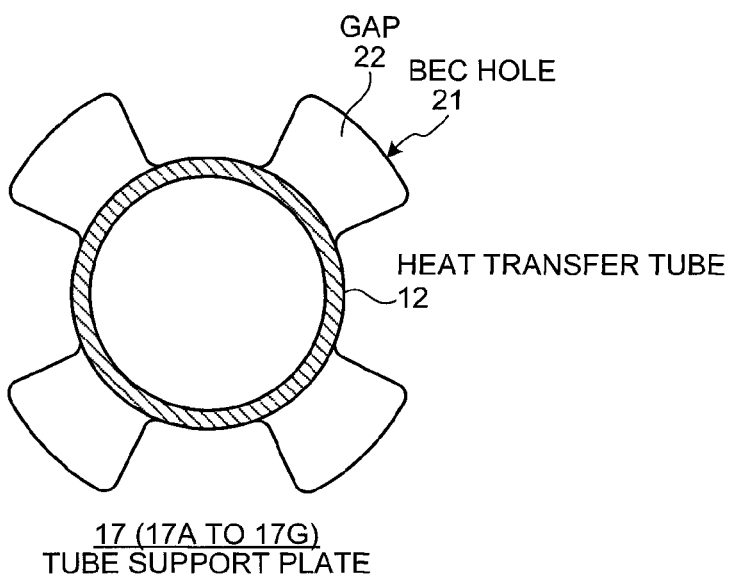
FIG. 3 is a sectional view of a hole of a tube support plate when a heat transfer tube is inserted therethrough.

A blockage-rate evaluation system of an insertion hole (a BEC hole) according to a first embodiment of the present invention is explained with reference to the drawings. The present embodiment is an example of evaluating the blockage rate of a plurality of gaps formed in a circumferential direction of the BEC hole when a heat transfer tube is inserted through the BEC hole, which is for inserting the heat transfer tube therethrough, in a tube support plate of a steam generator applied to a nuclear power plant. FIG. 1 is an explanatory diagram of a configuration of a steam generator in a nuclear power plant. FIG. 2 is a sectional view of a tube support plate as viewed from an axial direction of a heat transfer tube, and FIG. 3 is a sectional view of a tube support plate when a heat transfer tube is inserted therethrough.

<Steam Generator>

A steam generator 10 includes a barrel 11, a plurality of heat transfer tubes 12, a steam-water separator 13, and a moisture separator 14. The barrel 11 has substantially a sealed hollow cylindrical shape and is arranged with a longitudinal direction being directed to a vertical direction. In the barrel 11, a lower barrel 11b has a slightly smaller diameter than that of an upper barrel 11a. In the lower barrel 11b of the barrel 11, there is provided an external tube-bundle cylinder 15 having a cylindrical shape and arranged with a predetermined gap from an inner wall surface of the barrel 11. A lower end of the external tube-bundle cylinder 15 is extended up to a tube plate 16 arranged at a bottom in the lower barrel 11b of the barrel 11. A heat-transfer tube bundle including a plurality of heat transfer tubes 12 is provided in the external tube-bundle cylinder 15.

Each of the heat transfer tubes 12 has an inverted U shape, and is arranged with a circular arc portion of the U shape being directed upward. Opposite ends directed downward are supported in the tube plate 16 and a middle part is supported by a plurality of tube support plates 17. The heat transfer tubes 12 are arranged by being inserted through the tube support plate 17 in each layer (17A to 17G) and curved upwards in the inverted U shape.

A plurality of tube support plates 17 are arranged in the external tube-bundle cylinder 15 with a predetermined gap therebetween. These tube support plates 17 are perforated plates respectively having a plurality of BEC holes 21 for inserting each of the heat transfer tubes 12 therethrough. The BEC hole 21 has a four-leafed shape, and bored in the tube support plate 17. Each of the heat transfer tubes 12 passes through the BEC hole 21 in the tube support plate 17. By inserting the heat transfer tube 12 through the BEC holes 21 in the tube support plates 17A to 17G, gaps 22 as shown in FIG. 3 are formed on an outer periphery of the BEC hole 21, thereby circulating feed water. When the uppermost tube support plate 17G is inspected, for example, a visual inspection camera or the like provided in an inspection device is brought in from a maintenance hatch above the steam-water separator 13. Furthermore, a series of oval flow slots are bored in a diametrical direction of the barrel 11 in a central part of the tube support plate 17 at the vertically same positions of the tube support plates 17 of respective layers. A pair of hand holes 25 is also provided in the barrel 11 opposite to each other in a diametrical direction, immediately above the tube support plate 17 in the lower layer. The visual inspection camera or the like provided in the inspection device can be brought in from the hand hole 25 into the steam generator 10.

The barrel 11 also has a water chamber 27 at the bottom thereof. The water chamber 27 includes a pair between an entrance chamber 31 and an exit chamber 32 laid out by the tube plate 16 and a partition plate 30 therein. One end of each heat transfer tube 12 is communicated with the entrance chamber 31, and the other end of each heat transfer tube 12 is communicated with the exit chamber 32. Furthermore, an inlet nozzle 33 leading to the outside of the barrel 11 is formed in the entrance chamber 31, and an outlet nozzle 34 leading to the outside of the barrel 11 is formed in the exit chamber 32. Cooling water piping through which a primary cooling material (water) 35 is fed from a pressurized water reactor side is connected to the inlet nozzle 33. Cooling water piping through which the primary cooling material 35 after being heat-exchanged is fed to the pressurized water reactor side is connected to the outlet nozzle 34. The primary cooling material 35 is fed to the pressurized water reactor side via the inlet nozzle 33 (the outlet nozzle 34).

The steam-water separator 13 and the moisture separator 14 are provided in the upper barrel 11a of the barrel 11. The steam-water separator 13 separates feed water into steam and hot water. The hot water becomes a secondary cooling material (water) 37 circulated toward the tube plate 16 and re-circulated. The moisture separator 14 reduces moisture of the separated steam to turn it into substantially dry steam.

A water feeding pipe 38 for feeding the secondary cooling material (water) 37 from outside into the barrel 11 is inserted to between the steam-water separator 13 and the moisture separator 14. Furthermore, a steam discharge port 41 is formed in the upper barrel 11a of the barrel 11. Inside the lower barrel 11b of the barrel 11, there is provided a water feeding channel 42 that causes the secondary cooling material 37 fed into the barrel 11 from the water feeding pipe 38 to flow down between the barrel 11 and the external tube-bundle cylinder 15 and then move up along the heat transfer tube bundle, by returning at the tube plate 16. Cooling water piping for feeding steam to a turbine is connected to the steam discharge port 41, and cooling water piping for feeding the secondary cooling material 37 acquired by cooling steam used in the turbine by a steam condenser to the water feeding pipe 38.

In the steam generator 10, the primary cooling material 35 heated in a pressurized water reactor flows into the entrance chamber 31 from the inlet nozzle 33, circulates through the heat transfer tubes 12 and enters into the exit chamber 32, and then discharged to outside from the outlet nozzle 34. Furthermore, the secondary cooling material 37 cooled by a steam condenser 23 is fed to the water feeding pipe 38, passes through the water feeding channel 42 in the external tube-bundle cylinder 15, and moves up along the heat transfer tube bundle. At this time, heat exchange is performed between the high-pressure and high-temperature primary cooling material 35 and the secondary cooling material 37 in the external tube-bundle cylinder 15, to heat the secondary cooling material 37. The cooled primary cooling material 35 is returned into the pressurized water reactor from the exit chamber 32. Further, the secondary cooling material 37 heat-exchanged with the high-pressure and high-temperature primary cooling material 35 moves up in the barrel 11, and is separated into steam and hot water by the steam-water separator 13. The separated steam is fed to the turbine after moisture is reduced by the moisture separator 14.

When the blockage rate of the gaps 22 in the BEC hole 21 of the steam generator 10 is evaluated, in the case of performing visual inspection, a visual inspection camera or the like provided in the inspection device is brought in from the maintenance hatch above the steam-water separator 13, that is, from a feeding side of the secondary cooling material (water) 37. When ECT inspection is performed, an eddy current testing (ECT) probe provided in a guiding device or an insertion device is inserted and brought in from the bottom of the tube plate 16, that is, from the feeding side of the primary cooling material (water) 35. An image of the gaps 22 in the BEC hole 21 captured by the visual inspection camera is transferred to a processing device 50 and processed. Furthermore, an eddy current testing signal (an ECT signal) acquired by the ECT inspection is transferred to another processing device and processed, thereby acquiring an ECT waveform.

Figure 4:
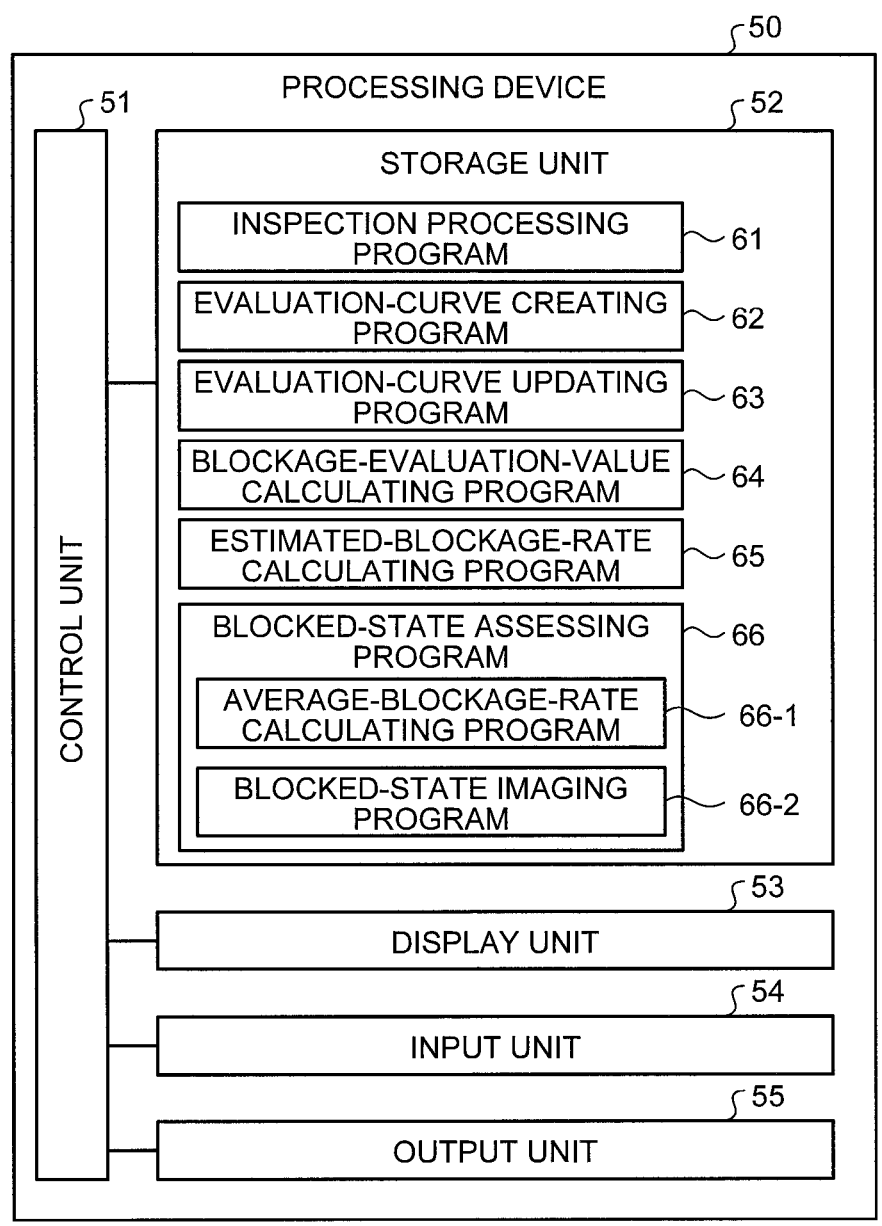
FIG. 4 is a block diagram of functions provided in a processing device in a deployed manner.

At the time of evaluating the blockage rate of the gaps 22 in the BEC hole 21 of the steam generator 10, the processing device 50 is used to perform control. The processing device 50 is a computer system, which reads a program from a recording medium (a recording unit) that stores therein a blockage-rate evaluation program of the BEC hole 21 according to the present embodiment for evaluating an estimated blockage rate of the gaps 22 in the BEC hole 21 and operates as a computing device of the blockage-rate evaluation system of the BEC hole 21 according to the present embodiment. FIG. 4 is a block diagram of functions provided in the processing device 50 in a deployed manner. As shown in FIG. 4, the processing device 50 includes a control unit 51, a storage unit 52, a display unit 53, an input unit 54, and an output unit 55.

The control unit 51 is a CPU (Central Processing Unit), and is connected to the units mentioned above to control the entire processing device 50. For example, when the gaps 22 in the BEC hole 21 are to be visually inspected, a visual inspection camera is remotely operated from outside of the steam generator 10, to capture images by the visual inspection camera. The control unit 51 acquires images captured by the visual inspection camera from an inspection device 43, and records the images in the recording unit 52.

When the ECT waveform acquired by performing ECT inspection is used as the blockage evaluation value of the BEC hole 21, an ECT signal acquired by the ECT probe by remotely operating the ECT probe from outside of the steam generator 10 is transmitted to another processing device to calculate the ECT waveform.

The control unit 51 acquires the ECT waveform acquired by the ECT inspection from the other processing device and records the ECT waveform in the recording unit 52. Furthermore, the control unit 51 reads a predetermined program recorded in the storage unit 52, to create an evaluation curve based on the image captured by a visual inspection camera and the ECT waveform acquired by the ECT inspection, and performs a calculation of an estimated blockage rate and an average blockage rate of the BEC hole 21.

The recording unit 52 records therein images captured by a visual inspection camera and the ECT waveform acquired by the ECT inspection, as well as captured images. The recording unit 52 stores therein a program used for a blockage-rate evaluation method of the BEC hole 21 using the blockage-rate evaluation system (described later) of the BEC hole 21 according to the present embodiment. The recording unit 52 stores therein an inspection processing program 61, an evaluation-curve creating program 62, an evaluation-curve updating program 63, a blockage-evaluation-value calculating program 64, an estimated-blockage-rate calculating program 65, and a blocked-state assessing program 66. Furthermore, the blocked-state assessing program 66 includes an average-blockage-rate calculating program 66-1 and a blocked-state imaging program 66-2.

The display unit 53 displays images being captured by a visual inspection camera, the created evaluation curve, and the calculated estimated blockage rate and average blockage rate. The display unit 53 also displays an image after being processed by an image processing device and various information data.

The input unit 54 inputs various information data for controlling the inspection device 43 that operates a visual inspection camera. The input unit 54 reads image data acquired by the visual inspection camera, data of the ECT waveform or the like acquired by the ECT inspection, and image data after being processed by the image processing device.

The output unit 55 outputs various information data for controlling the recording unit 52 and the inspection device 43 that controls a visual inspection camera. The output unit 55 outputs a calculation result of the blockage rate of the gaps 22 in the BEC hole 21 to a recording medium or a printer, and transmits image data acquired by the visual inspection camera, data such as the ECT waveform or the like acquired by the ECT inspection, and image data after being processed by the image processing device.

<Blockage-Rate Evaluation Method of BEC Hole>

Figure 5:
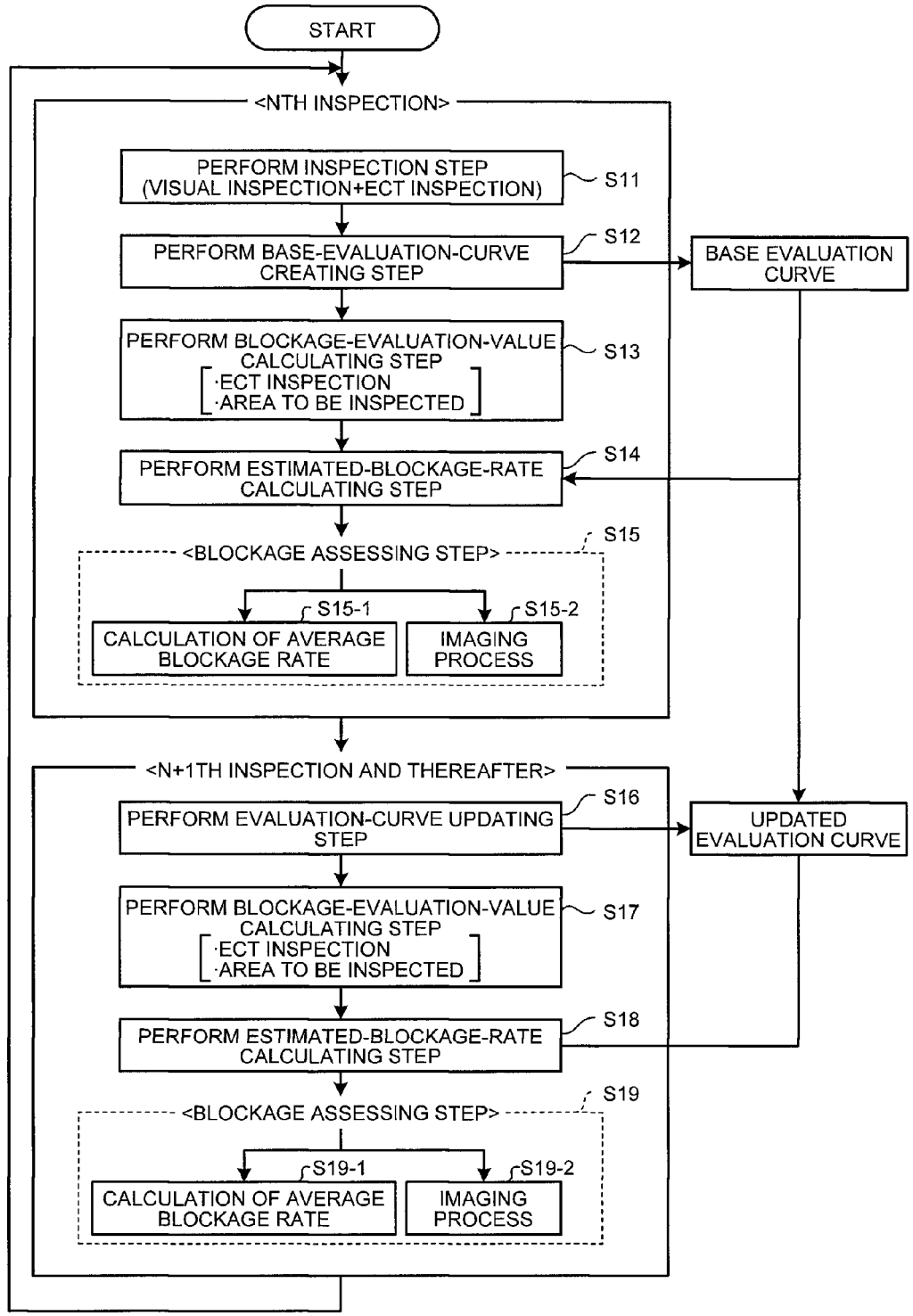
FIG. 5 is an example of a blockage-rate evaluation method of a BEC hole according to an embodiment of the present invention.

The blockage-rate evaluation method of the BEC hole using the blockage-rate evaluation system of the BEC hole according to the present embodiment is explained with reference to the drawings. FIG. 5 is a flowchart of an example of the blockage-rate evaluation method of the BEC hole according to the present embodiment. As shown in FIG. 5, the blockage-rate evaluation method of the BEC hole according to the present embodiment includes the following steps. In the present embodiment, N represents an integer equal to or larger than 1.

(A) An inspection step of performing Nth visual inspection and acquiring an ECT signal (Step S11)

(B) A base-evaluation-curve creating step of determining a blockage evaluation value based on the actual blockage rate of the gaps 22 in the BEC hole 21 determined by visual inspection and an ECT signal of the gaps 22 corresponding to a visual inspection point, and creating an evaluation curve (a base evaluation curve) based on the actual blockage rate and the blockage evaluation value (Step S12)

(C) A blockage-evaluation-value calculating step of calculating a blockage evaluation value of the gaps 22 based on an ECT waveform of the BEC hole 21 at a predetermined position (Step S13)

(D) An estimated-blockage-rate calculating step of calculating an estimated blockage rate of the gaps 22 based on the base evaluation curve and the calculated blockage evaluation value (Step S14)

(E) A blocked-state assessing step of assessing a blocked state of the BEC hole 21 based on the calculated estimated blockage rate (Step S15)

(F) An evaluation-curve updating step of updating the base evaluation curve created at the time of Nth inspection of the blockage rate of the BEC hole 21 to that close to the blockage rate of the gaps 22 to be inspected at the time of N+1th inspection and thereafter, when the blockage rate of the BEC hole 21 is checked in the N+1th round and thereafter (Step S16)

(G) A blockage-evaluation-value calculating step of calculating a blockage evaluation value of the gaps 22 based on the ECT waveforms of the BEC holes 21 in the tube support plates 17 (17A to 17G) (Step S17)

(H) An estimated-blockage-rate calculating step of calculating an estimated blockage rate of the gaps 22 based on the updated evaluation curve and the calculated blockage evaluation value (Step S18)

(I) A blocked-state assessing step of assessing the blocked state of the BEC hole 21 based on the calculated estimated blockage rate (Step S19)

[Nth Inspection]
(Inspection Step: Step S11)

Figure 6:
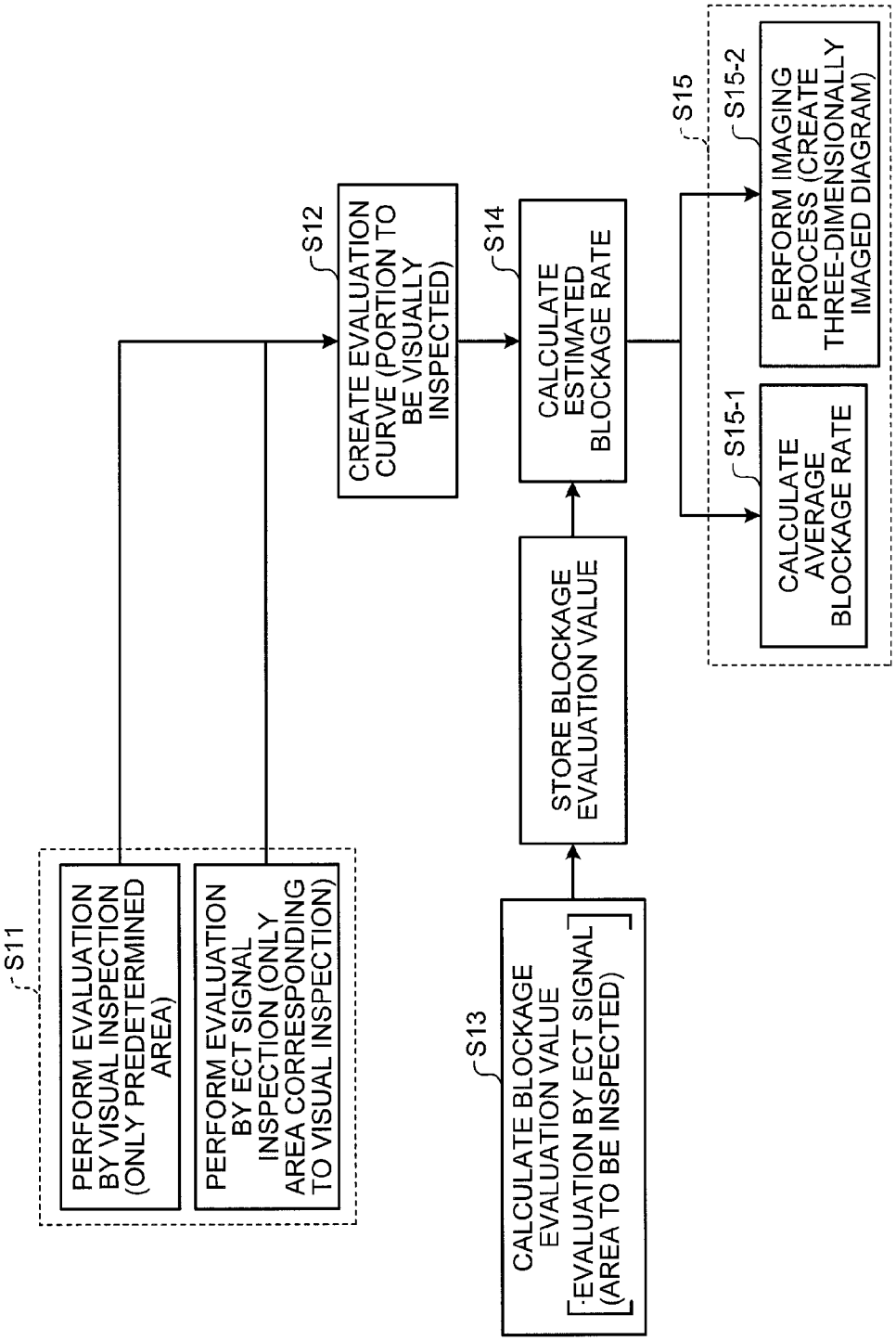
FIG. 6 is an explanatory diagram of an evaluation of a blockage rate of gaps in a BEC hole in an Nth round.

FIG. 6 is an explanatory diagram of an evaluation of the blockage rate of the gaps 22 in the BEC hole 21 in the Nth round. As shown in FIGS. 5 and 6, at the time of the Nth inspection, visual inspection is first performed, and the ECT inspection is performed (Step S11). Visual inspection is performed in the following manner. That is, a visual inspection camera is inserted from the maintenance hatch above the steam-water separator 13, that is, from the feeding side of the secondary cooling material (water) 37, to capture an image of the gaps 22 in an arbitrarily selected BEC hole 21 within a predetermined range of the uppermost tube support plate 17G and record the captured image, and the blockage rate of the gaps is determined based on the recorded image. Specifically, visual inspection is realized by reading and executing the inspection processing program 61 in the recording unit 52 by the control unit 51.

Figure 7:
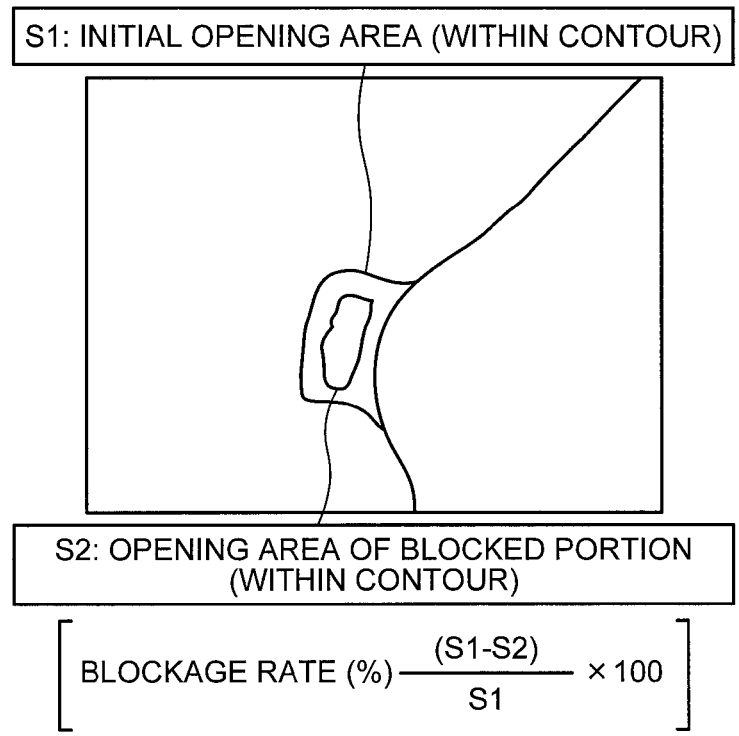
FIG. 7 is an example of a captured and recorded image.

The blockage rate of the gaps 22 is an area ratio between an area in which fouling adheres and the entire area of the gaps 22, of the gaps 22 formed between the tube support plate 17 (17A to 17G) and an external surface of the heat transfer tube 12, when the BEC hole 21 is viewed from an axial direction of the heat transfer tube 12. FIG. 7 is an example of a captured and recorded image. As shown in FIG. 7, an initial opening area S1 at the time of an initial operation and an opening area S2 of a blocked portion at the time of inspection after a predetermined period has passed since start of the operation are determined, and a value is obtained as the blockage rate by dividing a difference between the initial opening area S1 and the opening area S2 of the blocked portion by the initial opening area S1, as shown in the following equation (1). Blockage rate (%)=((initial opening area S1−opening area S2 of blocked portion)/initial opening area S1)×100 The blockage rate of the gap 22 at the time of visual inspection represents the blockage rate of each gap 22 of four gaps 22 formed in the BEC hole 21 into which the heat transfer tube 12 is inserted. However, as in the present embodiment, at the time of performing the ECT inspection with respect to the gaps 22 in the BEC hole 21, when a blocked rate of the four gaps 22 formed in the BEC hole 21 is designated as the blockage rate of the gaps 22 in the BEC hole 21, the blockage rate of the gap 22 acquired by the visual inspection is similarly designated as the blocked rate of the four gaps 22 formed in the BEC hole 21.

Figure 8:
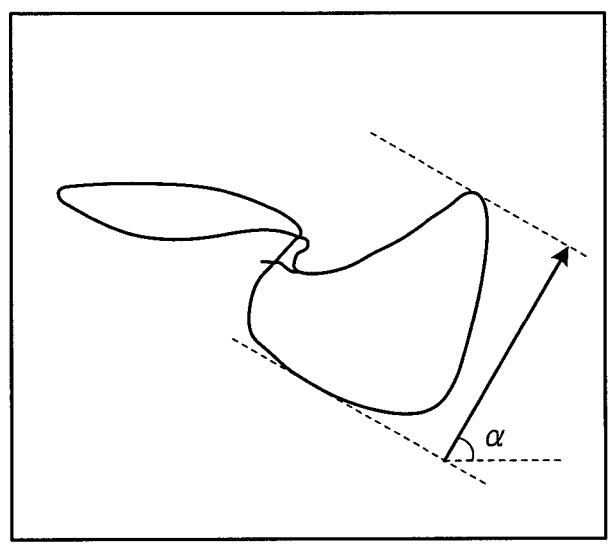
FIG. 8 is an example of an ECT waveform.

In the ECT inspection for obtaining an ECT waveform by using the eddy current testing (ECT), the bobbin-coil ECT probe is generally used. FIG. 8 is an example of an ECT waveform. An ECT signal of the gaps 22 in the BEC hole 21 is detected by the bobbin-coil ECT probe to acquire an ECT waveform as shown in FIG. 8. A blockage evaluation value is determined based on the acquired ECT waveform. For example, an amplitude a in a specific direction is measured, and an ECT voltage corresponding to the measured amplitude α is designated as a blockage evaluation value. When the gaps 22 in the BEC hole 21 are blocked by scales, which are conductive substances, eddy current flows not only to the heat transfer tubes but also to the scales, thereby changing the flow of eddy current. Accordingly, the amplitude of the ECT waveform acquired from the ECT signal changes. In the present embodiment, the ECT voltage is acquired from the amplitude of the ECT waveform.

The blockage rate of the gaps 22 at the time of the ECT inspection represents a blocked rate of the four gaps 22 formed in the BEC hole 21 into which the heat transfer tube 12 is inserted.

Figure 9:
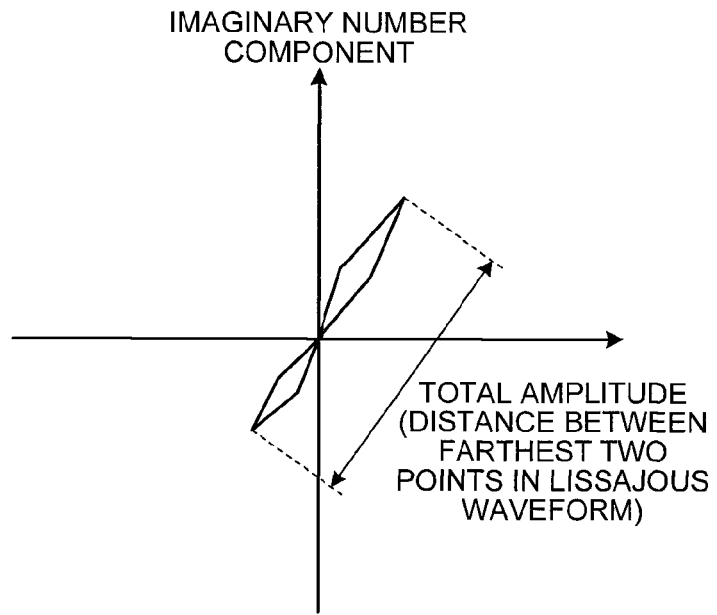
FIG. 9 is an explanatory diagram of how to obtain an amplitude of an ECT waveform.
Figure 10:
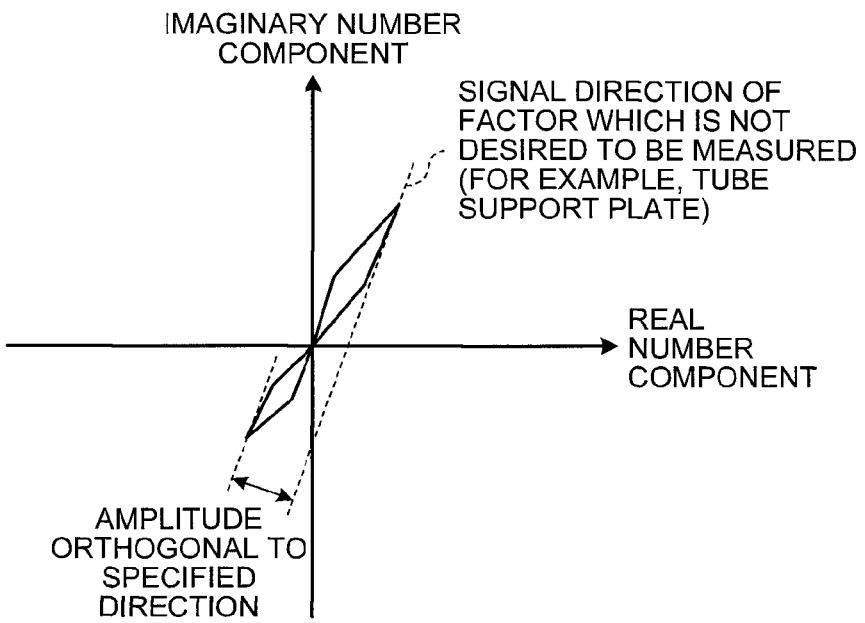
FIG. 10 is an explanatory diagram of how to obtain an amplitude of an ECT waveform.

As a method of determining the blockage evaluation value, there can be mentioned, other than the method of measuring the amplitude in a specific direction as shown in FIG. 8, a method of designating a distance between farthest two points in a Lissajous waveform (a waveform displaying a measurement signal with a real number component of the measurement signal being plotted on a horizontal axis and an imaginary number component thereof being plotted on a vertical axis) as the amplitude as shown in FIG. 9, a method of determining a direction of a signal of a factor, which is not desired to be measured (for example, a tube support plate), and adopting an amplitude in a direction orthogonal to the particular direction as shown in FIG. 10, and a method of adopting an amplitude in a signal, from which an elementary signal is subtracted. Furthermore, a method of combining a plurality of amplitude values that can be read from an ECT waveform by a weighted average method or the like to obtain a blockage evaluation value can be mentioned.

Furthermore, in the present embodiment, an ECT waveform acquired by the ECT inspection is used for calculating the blockage evaluation value. However, the present embodiment is not limited thereto, and a blockage evaluation value of the BEC hole 21 only needs to be determined. For example, a method of measuring a scale thickness by performing vertical ultrasonic flaw detection can be mentioned.

Further, visual inspection has considerable limitations such as carrying in of the device, accessibility and the like, and needs a cumbersome operation. Therefore, if there is a method having high correlation with the actual blockage rate and excellent workability, it can be used as a calculation method of the blockage rate instead of visual inspection.

(Base-Evaluation-Curve Creating Step: Step S12)

An evaluation curve (a base evaluation curve) is created based on the actual blockage rate of the gaps 22 in the BEC hole 21 acquired by visual inspection and the blockage evaluation value determined based on an ECT waveform at a position corresponding to the visual inspection (Step S12). Specifically, it is realized by reading and executing the evaluation-curve creating program 62 in the recording unit 52 by the control unit 51.

In the present embodiment, the evaluation curve is created based on the actual blockage rate of the gaps 22 in the BEC hole 21 acquired by visual inspection and the blockage evaluation value determined based on the ECT waveform at the position corresponding to the visual inspection. Therefore, as the actual blockage rate of the gaps 22 in the BEC hole 21 acquired by visual inspection, a blocked rate of the four gaps 22 formed in the BEC hole 21 is designated as the blockage rate of the gaps 22.

Figure 11:
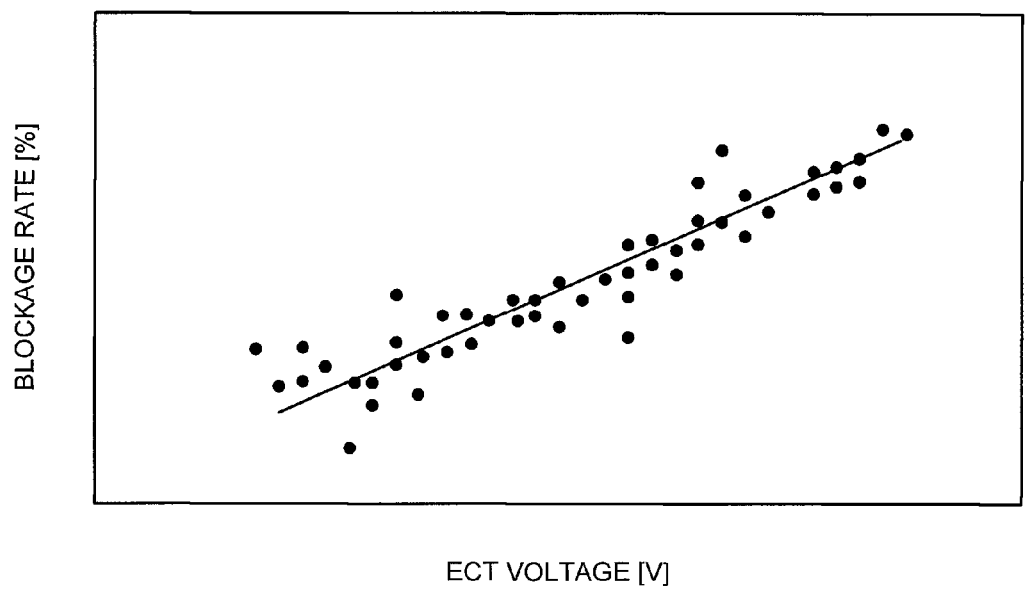
FIG. 11 is an example of an evaluation curve.
Figure 12:
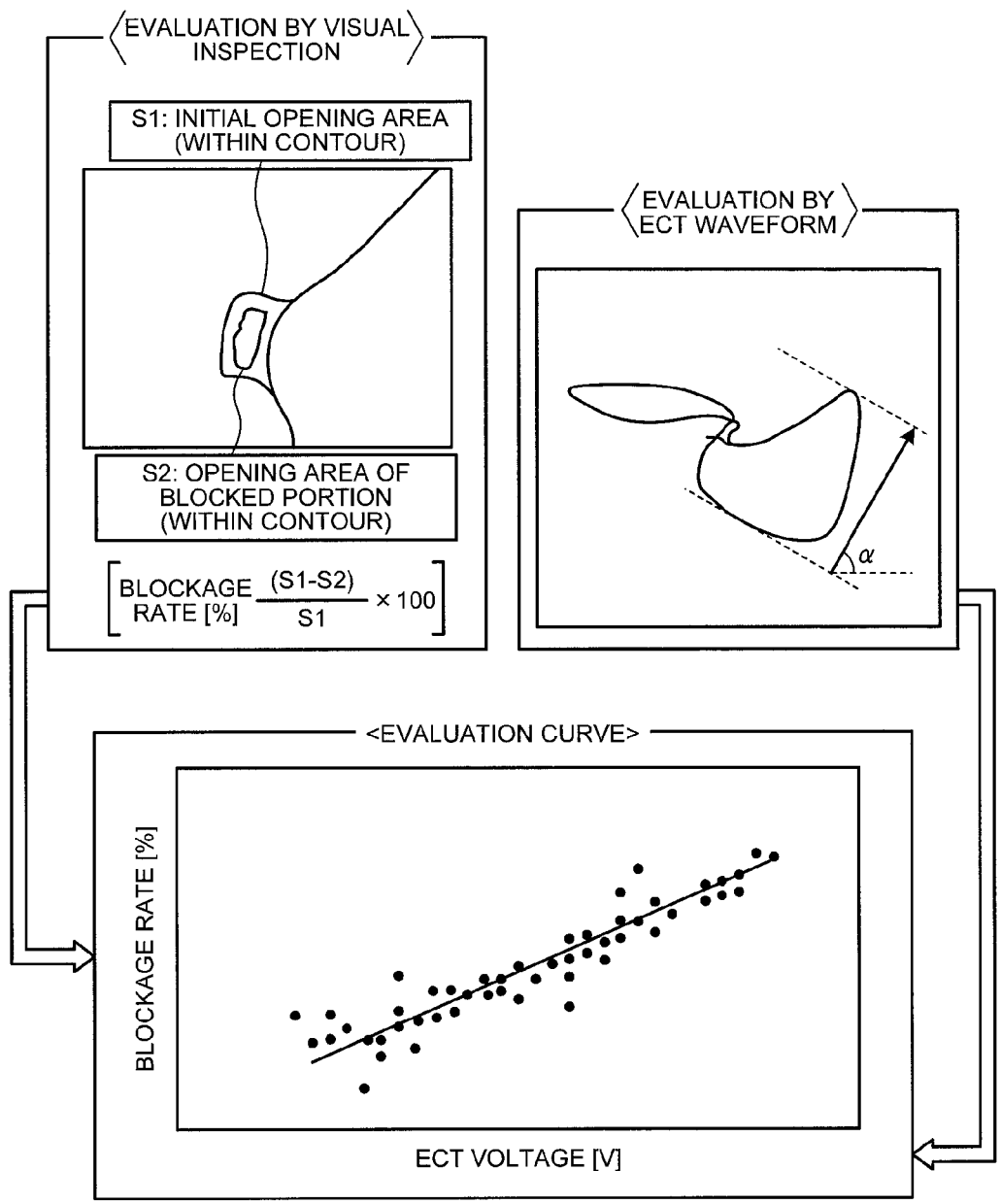
FIG. 12 is an explanatory diagram of an example in which an evaluation curve is created by combining values determined based on visual inspection and an ECT waveform.
Figure 13:
FIG. 13 is an example of an ECT signal in gaps in a BEC hole at respective ECT-inspected positions.
Figure 14:
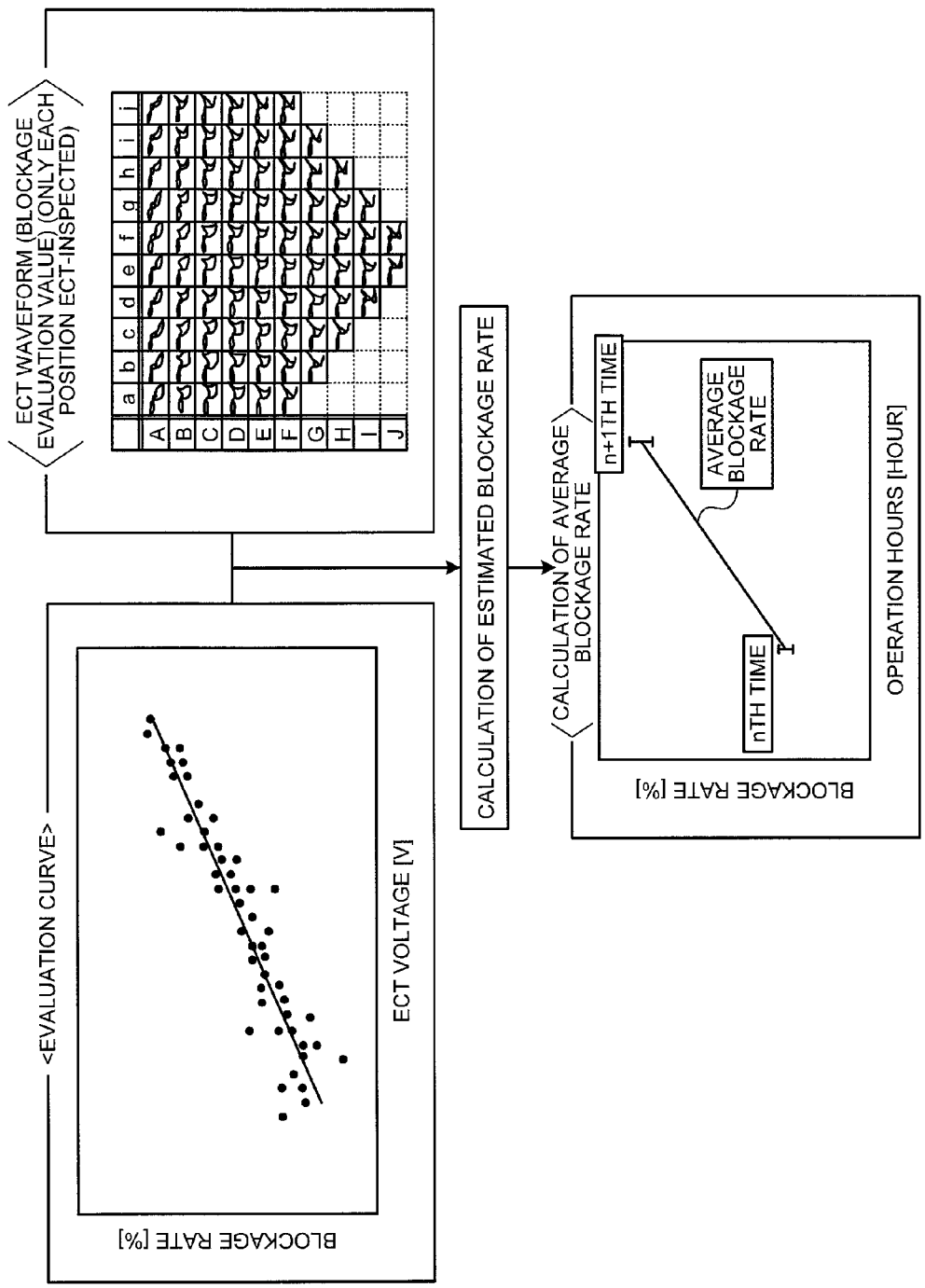
FIG. 14 depicts a relation between an operation time and a blockage rate.

FIG. 11 is an example of the evaluation curve, and FIG. 12 is an explanatory diagram of an example in which an evaluation curve is created by combining the blockage evaluation values determined based on visual inspection and the ECT waveform. As shown in FIGS. 11 and 12, the evaluation curve is created based on the blockage evaluation values acquired by visual inspection and based on the ECT waveform corresponding to the visual inspection. The evaluation curve (the base evaluation curve) can be expressed, for example, as in the following equation.

$$Z(i) = f(E(i)) = a \cdot E(i) + b \qquad (1),$$

where

Z(i): an estimated blockage rate of the gaps,
f: an evaluation curve and a function of one variable, while designating the blockage evaluation value as an input variable and the estimated blockage rate as an output,
a: inclination of the evaluation curve,
E(i): a blockage evaluation value determined based on the ECT waveform, and
b: a segment of the evaluation curve.

In the present embodiment, a value calculated based on the ECT waveform is used for a calculation of the blockage evaluation value. However, the present embodiment is not limited thereto, and any value that can be the blockage evaluation value of the BEC hole 21 can be used.

(Blockage-Evaluation-Value Calculating Step: Step S13)

A blockage evaluation value of the gaps 22 in the BEC hole 21 at a predetermined position is calculated (Step S13). In the present embodiment, a value of an amplitude of the ECT waveform (for example, the amplitude a in FIG. 8) is used as the blockage evaluation value. At the time of regular inspection, ECT waveforms of all heat transfer tubes are obtained for confirming soundness of the heat transfer tubes. The ECT waveform at a required position is directly used as the blockage evaluation value from these ECT waveforms, thereby enabling to reduce the time and labor for newly obtaining the ECT waveform. The position (the address) to be used for an evaluation is appropriately selected from the entire area of the tube support plate 17G so that the blocked state of the entire steam generator can be easily assessed.

In the present embodiment, a value calculated based on the ECT waveform is used for a calculation of the blockage evaluation value. However, the present embodiment is not limited thereto, and any value that can be the blockage evaluation value of the BEC hole 21 can be used.

(Estimated-Blockage-Rate Calculating Step: Step S14)

An estimated blockage rate of the gaps 22 in the BEC hole 21 at respective positions (addresses) is calculated from the blockage evaluation values calculated based on the ECT waveforms at the blockage-evaluation-value calculating step (Step S13), by using the base evaluation curve shown in FIG. 11 (Step S14). Specifically, it is realized by reading and executing the estimated-blockage-rate calculating program 65 in the recording unit 52 by the control unit 51. The estimated blockage rate of the gaps 22 at the respective positions (addresses) is stored in a memory or a file. As shown in FIG. 6, the blockage evaluation value output at Step S13 is once stored in a file or a memory. Accordingly, even if the evaluation curve is recalculated and changed at Step S11 due to addition of visual inspection data and the ECT waveform data or removal of inappropriate data, the estimated blockage rate can be calculated without recalculating the blockage evaluation value.

(Blocked-State Assessing Step: Step S15)

A blocked state of the gaps 22 in the BEC hole 21 at respective ECT-inspected positions (addresses) is assessed based on the calculated estimated blockage rate (Step S15). As the blocked state of the BEC hole 21, in the present embodiment, a calculation of an average blockage rate of the BEC hole 21 (Step S15-1) or an imaging process of imaging the blocked state of the BEC hole 21 (Step S15-2) is performed.

(Calculation of Average Blockage Rate: Step S15-1)

An average blockage rate is determined by averaging the values of the estimated blockage rate calculated at Step S14. The average blockage rate can be a mean value of the estimated blockage rate of the four gaps 22 between each BEC hole 21 and each heat transfer tube, or a mean value of a plurality of estimated blockage rates of the four gaps 22 in the BEC hole 21. Furthermore, an average blockage rate of a plurality of tube support plates 17 can be determined by using all the estimated blockage rates calculated at Step S14, or a mean value of the estimated blockage rate is determined for each of the tube support plates 17 to determine the average blockage rate for each of the tube support plates 17. Specifically, it is realized by reading and executing the average-blockage-rate calculating program 66-1 of the blocked-state assessing program 66 in the recording unit 52 by the control unit 51.

(Blocked-State Imaging Process: Step S15-2)

In the imaging process, color coding and display are performed according to the estimated blockage rate of the BEC hole 21 in the respective tube support plates 17A to 17G. Specifically, it is realized by reading and executing the blocked-state imaging program 66-2 of the blocked-state assessing program 66 in the recording unit 52 by the control unit 51.

(Three-Dimensional Imaging)

In the imaging process, three-dimensional imaging can be performed by converting the respective tube support plates 17A to 17G to three-dimensional images. The respective tube support plates 17A to 17G are serially arranged so as not to overlap on each other and displayed in an elliptical diagram with a ratio between a long axis and a short axis of the support plate being within a predetermined range. The three-dimensional diagrams are color-coded and displayed according to the estimated blockage rate of the BEC hole 21 in the respective tube support plates 17A to 17G, thereby enabling to display the blocked states of the respective BEC hole 21 in the tube support plates 17A to 17G in a three dimensional manner.

Figure 15:
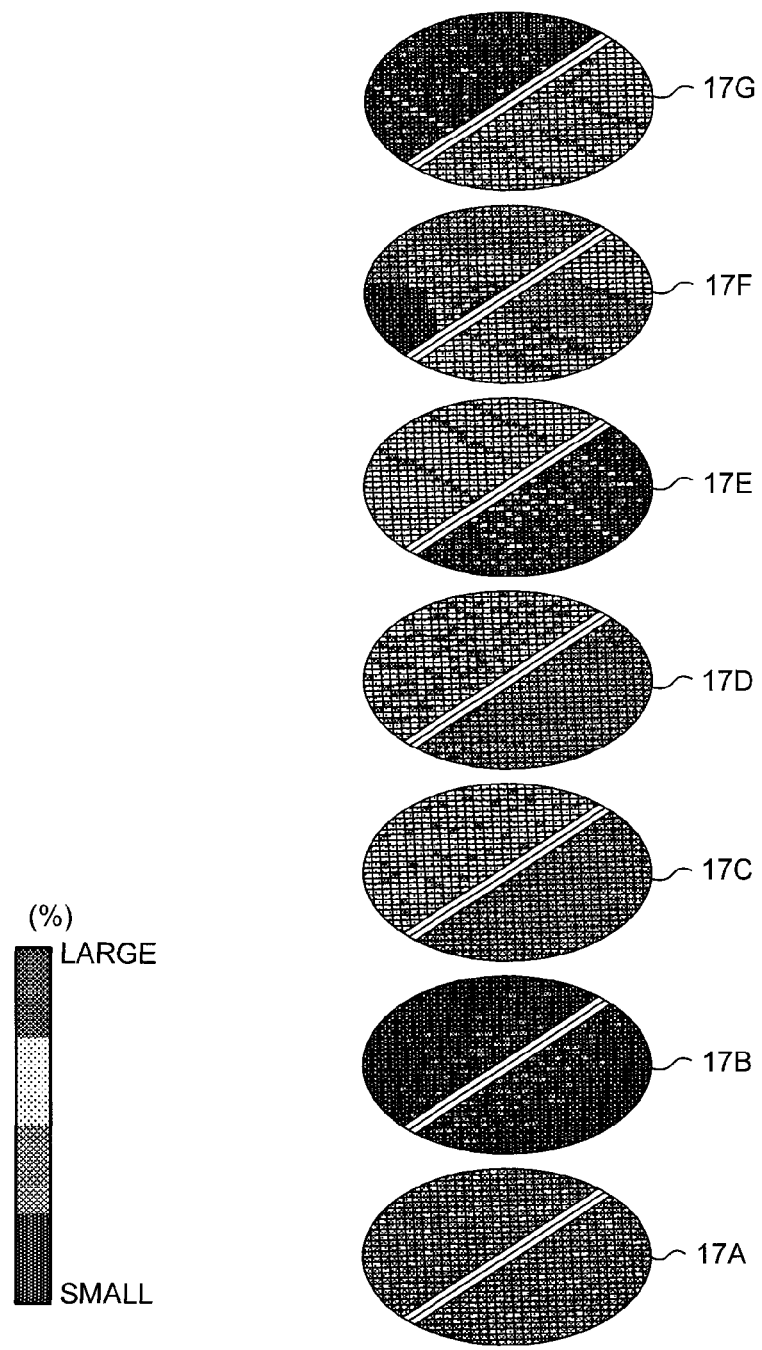
FIG. 15 is an example in which tube support plates are displayed in a three dimensional manner.

An example in which the tube support plates 17A to 17G are displayed in a three dimensional manner is shown in FIG. 15. As shown in FIG. 15, in the three-dimensionally displayed diagram, the respective tube support plates 17A to 17G are serially arranged so as not to overlap on each other, and the estimated blockage rate of the BEC hole 21 in the respective tube support plates 17A to 17G are color-coded and displayed according to the values of the estimated blockage rate of the BEC hole 21. Accordingly, the distribution of the estimated blockage rate of the BEC hole 21 in the respective tube support plates 17A to 17G can be easily assessed, thereby enabling to easily assess the overall state of the steam generator 10.

At the time of displaying the respective tube support plates 17A to 17G in a three dimensional manner, it is desired that the ratio between the long axis and the short axis of the BEC hole 21 is within a range from 1.0 to 2.0 inclusive, and particularly that the ratio is the golden ratio (1.62). In FIG. 15, the tube support plates are displayed in a three dimensional manner, while designating an axial ratio between the long axis and the short axis of an ellipse as 1.62:1. When the axial ratio between the long axis and the short axis of the ellipse is this axial ratio, the states of all surfaces of the tube support plates 17A to 17G can be confirmed, while maintaining the three-dimensional spatial relations in the tube support plates 17A to 17G of the steam generator 10.

Figure 16:
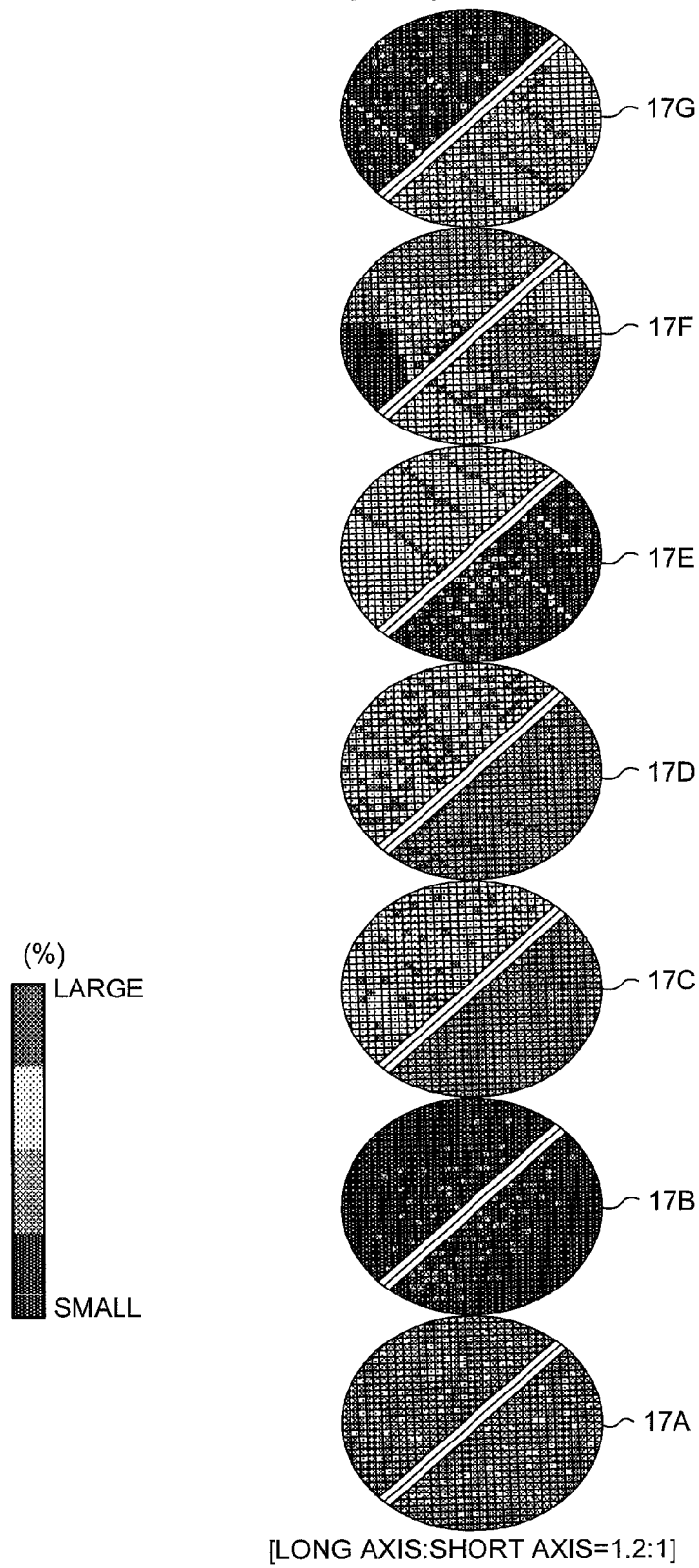
FIG. 16 is an example in which respective tube support plates are displayed in a three dimensional manner while changing an axial ratio.
Figure 17:
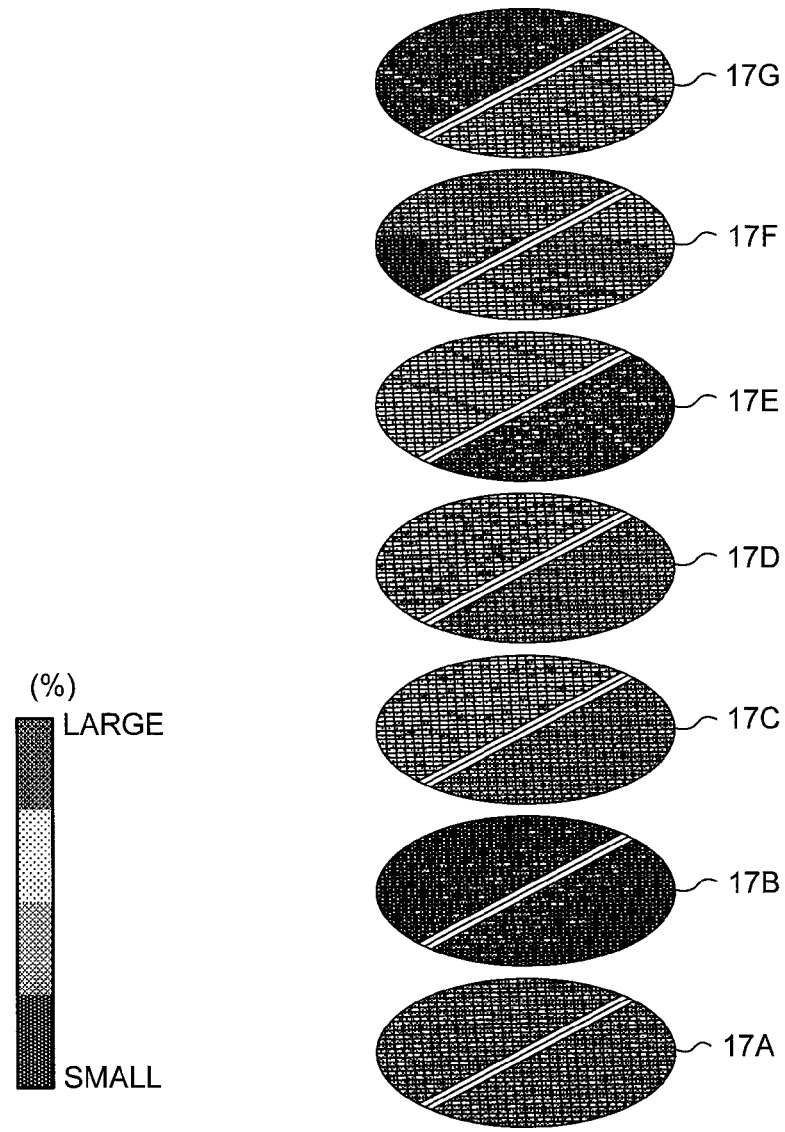
FIG. 17 is an example in which respective tube support plates are displayed in a three dimensional manner while changing an axial ratio.
Figure 18:
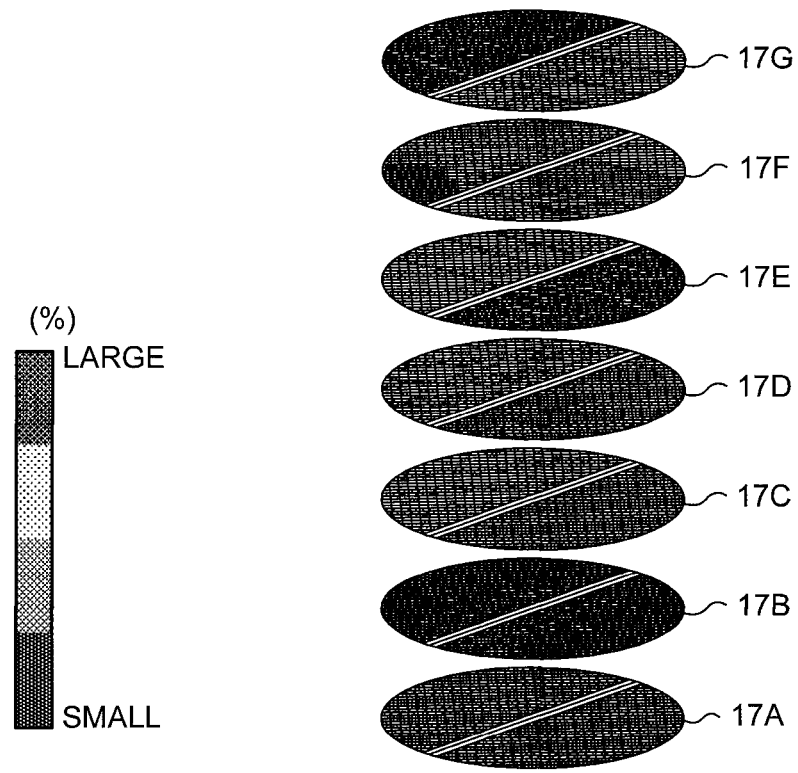
FIG. 18 is an example in which respective tube support plates are displayed in a three dimensional manner while changing an axial ratio.

FIGS. 16 to 18 are other examples in which blocked rates of the BEC hole in the respective tube support plates are displayed in a three dimensional manner. As shown in FIG. 16, when the axial ratio between the long axis and the short axis of the ellipse is 1.2:1, or as shown in FIG. 17, when the axial ratio between the long axis and the short axis of the ellipse is 2:1, the distribution of the estimated blockage rates of the BEC holes 21 in the serially arranged respective tube support plates 17A to 17G can be easily assessed, and the overall state of the steam generator 10 can be easily assessed. On the other hand, when the axial ratio between the long axis and the short axis of the ellipse is 3:1 as shown in FIG. 18, an area of the ellipse decreases, and display of the respective BEC holes 21 in the respective tube support plates 17A to 17G is densified. Therefore, the distribution of the estimated blockage rates of the BEC holes 21 in the serially arranged respective tube support plates 17A to 17G is hardly assessed, and thus it is difficult to easily assess the overall state of the steam generator 10. Accordingly, if the axial ratio between the long axis and the short axis of the ellipse is larger than 2.0, the area of the ellipse decreases, and the display of the respective BEC holes 21 in the respective tube support plates 17A to 17G is densified. Furthermore, if the axial ratio is smaller than 1.0, it is difficult to recognize the tube support plates 17A to 17G because the ellipse becomes longitudinal, and the BEC holes 21 in the respective tube support plates 17A to 17G can be hardly assessed.

Figure 19:
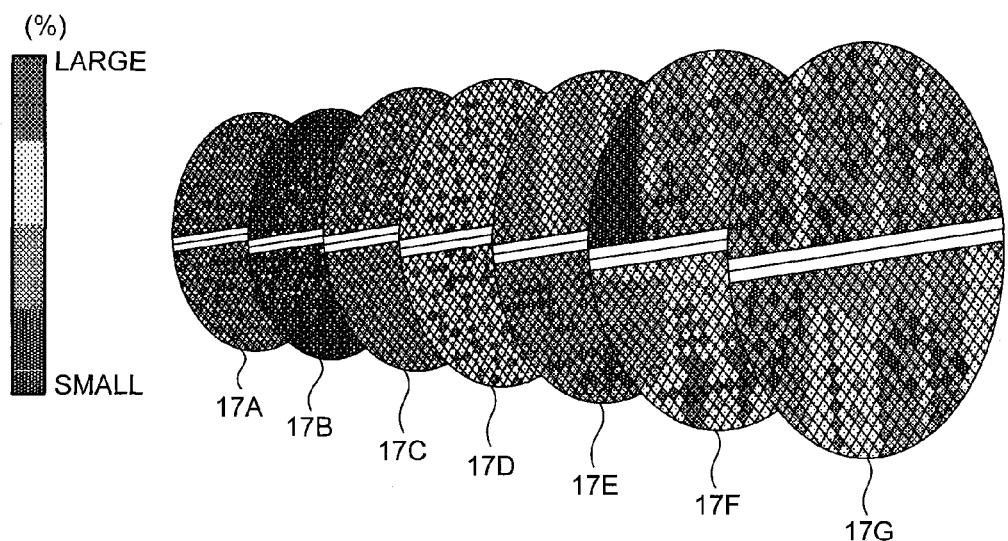
FIG. 19 is another example in which blocked rates of BEC holes in respective tube support plates are displayed in a three dimensional manner.

Further, when three-dimensional imaging is performed, as shown in FIGS. 15 to 18, the method is not limited to the method of longitudinally arranging the respective tube support plates 17A to 17G. However, to assess the distribution of the estimated blockage rates of the BEC holes 21 by displaying the respective tube support plates 17A to 17G in a three dimensional manner and to easily assess the overall state of the steam generator 10, it is desired to serially arrange the respective tube support plates 17A to 17G so as not to overlap on each other. FIG. 19 is another example in which the blocked rates of the BEC holes 21 in the respective tube support plates 17A to 17G are displayed in a three dimensional manner. As shown in FIG. 19, if diagrams three-dimensionally displaying the blockage of the gaps 22 in the BEC holes 21 in the tube support plates 17A to 17G are obliquely displayed based on the estimated blockage rate of the gaps 22 in the BEC hole 21 at each ECT-inspected position (address) in the respective tube support plates 17A to 17G, as shown in FIG. 17, it is difficult to easily and visually assess the blocked state in cross-sections of the respective tube support plates 17A to 17G.

Therefore, when the respective tube support plates 17A to 17G are displayed in the three-dimensionally converted diagram, the cross-sections of the respective tube support plates 17A to 17G are serially arranged so that the respective tube support plates 17A to 17G do not overlap on each other, and are displayed in the elliptical diagram with the ratio between the long axis and the short axis of the BEC hole 21 being within the predetermined range, and the tube support plates 17A to 17G are color-coded and displayed according to the estimated blockage rates of the BEC holes 21 in the respective tube support plates 17A to 17G. Accordingly, an intuitive image becomes similar to the actual installation state of the steam generator, thereby enabling to easily assess the blocked state in the cross-sections of the respective tube support plates 17A to 17G simultaneously.

(Leveling Process of Estimated Blockage Rate)

At the time of performing the imaging process (S15-2), a mean value of the estimated blockage rates of the gaps 22 positioned (addressed) close to each other in the same tube support plate can be used and displayed as the estimated blockage rate of the gaps 22 in each BEC hole 21 at respective positions (addresses) in the tube support plates 17a to 17G. Even if the estimated blockage rate of the gaps 22 in the BEC hole 21 varies widely at the ECT-inspected respective positions (addresses) in the respective tube support plates 17a to 17G, unevenness can be suppressed by using a mean value, thereby enabling to easily assess the tendency of blockage in the respective tube support plates 17a to 17G.

(Interpolation of Estimated Blockage Rate)

At the time of performing the imaging process (S15-2), a value of the estimated blockage rate of the gaps 22 in the BEC hole 21 at a position (an address), for which the estimated blockage rate has not been calculated yet, can be calculated by interpolation, imaged, and displayed by using a value of the estimated blockage rate of the gaps 22 in a neighboring BEC hole 21 in the same tube support plate, for which the estimated blockage rate has been calculated. Accordingly, when the estimated blockage rate is calculated only at a limited position (an address) of the gaps 22 in the BEC hole 21 to reduce the processing time, or if there is a position (an address) for which the estimated blockage rate of the gaps 22 in the BEC hole 21 cannot be calculated due to a certain restriction, that is, even if there is an omission of a value of the estimated blockage rate of the gaps 22 in the BEC hole 21, the estimated blockage rates of the gaps 22 in the BEC holes 21 in the tube support plates 17a to 17G can be continuously imaged and displayed. Accordingly, the overall tendency of the estimated blockage rates of the gaps 22 in the BEC holes 21 of the entire tube support plates 17a to 17G can be easily assessed.

Figure 20:
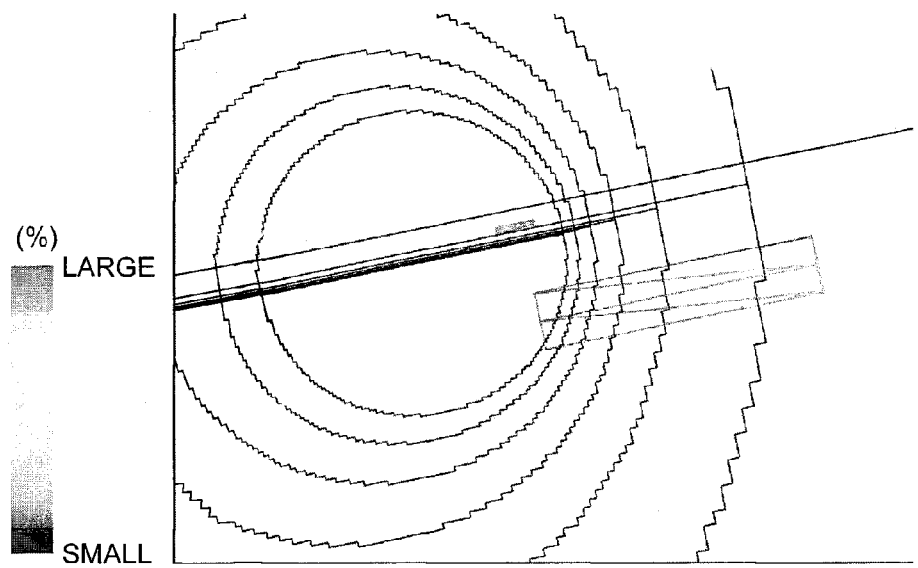
FIG. 20 depicts an interpolation method of an estimated blockage rate by using a Delaunay triangulation.
Figure 21:
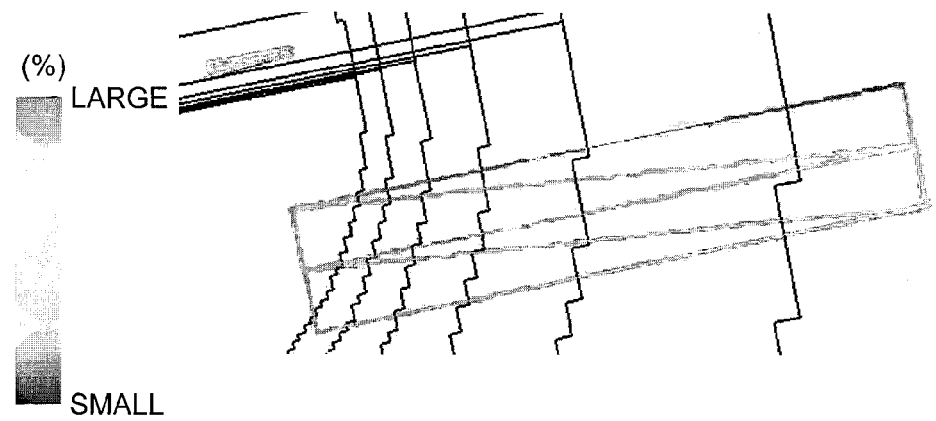
FIG. 21 is a partially enlarged diagram of FIG. 19.
Figure 22:
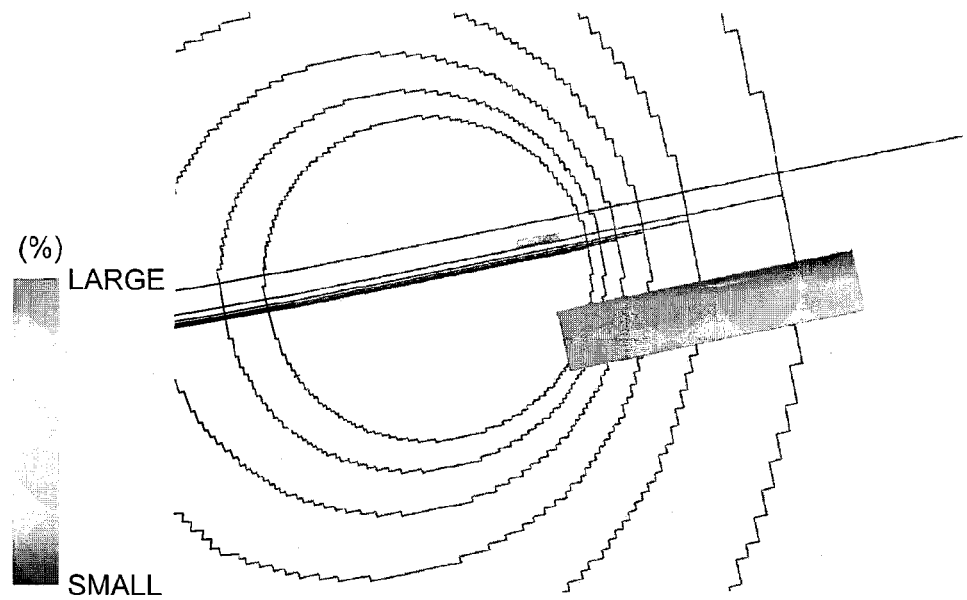
FIG. 22 is a diagram in which color is added.

As an interpolation method, for example, a method of using a Delaunay triangulation can be mentioned. Delaunay triangulation is a method of dividing a polygon into a plurality of triangles, using a point constituting the polygon as an apex. A position of each heat transfer tube at which the estimated blockage rate of the gaps 22 in the BEC hole 21 is calculated is designated as each apex. After a triangulation, values of inside and respective sides of the triangle are calculated by linear interpolation or the like, by using the value of the estimated blockage rate at each apex. FIG. 19 depicts a Delaunay triangulation, FIG. 20 is a partially enlarged diagram of FIG. 19, and FIG. 21 is a diagram in which FIG. 19 is colored. As shown in FIG. 19 to FIG. 21, the tendency of the estimated blockage rate of the BEC hole 21 at each position (address) in the tube support plates 17a to 17G can be easily assessed.

(Blocking-Speed Distribution Map)

At the time of performing the imaging process (S15-2), an approximate straight line by a least squares method is derived from the values of estimated blockage rates of the gaps 22 in the BEC hole 21 up to the Nth round at each tube position (address) in the tube support plates 17a to 17G, and an inclination of the approximate straight line is regarded as an estimated blocking speed at which the gaps 22 in the BEC hole 21 are blocked. By determining the estimated blocking speed from the inclination of the approximate straight line, the tendency of the estimated blockage rate of the gaps 22 in the BEC hole 21 can be determined. In this case, at least two regular inspections need to be performed.

Furthermore, at the time of performing the imaging process, the blocking speed of the gaps 22 in the BEC hole 21 expected based on operation hours up to an arbitrary inspection time is estimated from the inclination of the approximate straight line by the least squares method, and the blocking speed of the gaps 22 in the BEC hole 21 is added to the current estimated blockage rate of the gaps 22 in the BEC hole 21, thereby enabling to determine the estimated blockage rate of the gaps 22 in the BEC hole 21 at the time of inspection. Accordingly, the tendency of the estimated blockage rate of the BEC hole 21 at each position (address) in the tube support plates 17a to 17G can be easily assessed.

A colored tube support plate can be presented by coloring the determined estimated blockage rate of the gaps 22 in the BEC hole 21 and displaying the colored estimated blockage rate. Accordingly, the tendency of the estimated blockage rate of the BEC hole 21 at each position (address) in the tube support plates 17a to 17G can be easily assessed.

Furthermore, after the inclination by the approximate straight line of the estimated blockage rate of the gaps 22 in the BEC hole 21 is derived for each position (address) in the tube support plates 17a to 17G, the inclination is averaged for each steam generator 10, thereby enabling to determine the blocking speed for each steam generator 10.

Further, to facilitate assessment of the development speed of blockage of the BEC hole 21, a blocking-speed distribution map of the gaps 22 in the BEC hole 21 at each position (address) in the tube support plates 17a to 17G can be displayed, while performing the imaging process of the estimated blockage rate. Accordingly, the distribution of the development speed of the blockage can be easily assessed, thereby enabling to present the map as an index of a timing of implementation of cleaning and the like.

[N+1th Inspection and Thereafter]

In the N+1th inspection and thereafter, the evaluation curve used for the Nth inspection is reused to update the evaluation curve to the latest state.

(Evaluation-Curve Updating Step: Step S16)

At the time of inspecting the blockage rate of the BEC hole 21 in the N+1th inspection and thereafter, the evaluation curve is updated to that close to the latest state (Step S16). The blockage rate of the gaps 22 is evaluated as in the above inspection step (Step S11). In the N+1th inspection, visual inspection is performed only for the BEC hole 21 in a specific area in the tube support plates 17a to 17G and an ECT waveform is obtained, to calculate the actual blockage rate of the gaps 22 in the visually inspected area, and calculate a blockage evaluation value based on the ECT waveform. Specifically, it is realized by reading and executing the evaluation-curve updating program 63 in the recording unit 52 by the control unit 51.

The blockage evaluation value is determined based on the actual blockage rate of the gaps 22 in the specific area acquired by visual inspection and the ECT waveform at the position (the address) corresponding to the visual inspection, and the evaluation curve is updated by calculating a parameter value of an evaluation equation by using the least squares method so that an error amount in the following equation (2) becomes minimum. The least squares method is performed so that an error amount in combination data of the actual blockage rate and blockage evaluation value newly acquired in the N+1th inspection and thereafter is weighed heavily, as interpolated information, against the combination data of the actual blockage rate and the blockage evaluation value acquired in the Nth inspection, thereby updating the evaluation curve by reflecting the new data, while maintaining the basic information of the evaluation curve as a base. At the time of newly updating the evaluation curve, it is only necessary to increase an influence of the newly acquired combination data of a newly acquired actual blockage rate by the visual inspection and blockage evaluation value based on the ECT waveform. Therefore, α in the following equation (2) only needs to be larger than 1; however, if the influence of the newly acquired data is too large, the influence of the evaluation curve as the base decreases. The value of α is calculated in a simulated manner by using the data of the visual inspection and the blockage evaluation value acquired by a plurality of inspections in the past, thereby appropriately determining a reasonable value. The updated evaluation curve is stored in a memory, a file or the like.

As a method of updating the evaluation curve, various optimization algorithms such as a neural network and a gene algorithm can be used other than the statistical method described above.

$$\text{An error amount} = \Sigma(Y(i)-f(E(i)))^2 + \alpha \cdot \Sigma(Y(j)-f(E(j)))^2 \quad (2), \text{where}$$

Y: a blockage rate acquired by visual inspection,

E: a blockage evaluation value acquired based on the ECT waveform, i: original data of the previous evaluation curve, f: an evaluation curve and a function of one variable, while designating the blockage evaluation value as a variable and the estimated blockage rate as an output, α: weighting to an error, and j: data newly acquired this time.

Update of the evaluation curve is performed in such a manner that an inclination a and a segment b of the base evaluation curve created based on correlation between the blockage rate of the gaps 22 acquired by visual inspection and the blockage evaluation value acquired based on the ECT waveform in the inspection up to the Nth round are corrected based on the actual blockage rate of the gaps 22 acquired by visual inspection and the blockage evaluation value acquired based on the ECT waveform in the N+1th inspection and thereafter. Accordingly, the evaluation curve can be updated to the latest state, thereby enabling to decrease an evaluation error of the evaluation curve.

When the blockage rate of the gaps 22 is determined by visual inspection as the interpolated information, small-scale visual inspection can be performed by limiting an inspection area to a specific area where insertion of a visual inspection camera is easy, such as an area close to the hand hole 25.

In the present embodiment, a value calculated based on the ECT waveform is used for a calculation of the blockage evaluation value. However, the present embodiment is not limited thereto, and any value that can be used as the blockage evaluation value of the BEC hole 21 can be used.

Furthermore, in the present embodiment, the blockage rate and the blockage evaluation value at each position (address) in the N+1th inspection and thereafter are used as the interpolated information. However, there is such a method that an estimated blockage rate as a whole is determined from another point of view based on information of the water level and the thermal efficiency at the time of an operation in the N+1th inspection and thereafter, and a parameter of the evaluation curve is updated so that the determined estimated blockage rate matches with mean values of blockage evaluation values acquired based on the ECT waveform and estimated blockage rates determined based on the evaluation curve.

(Blockage-Evaluation-Value Calculating Step: Step S17)

A blockage evaluation value is calculated based on the ECT waveform of the gaps 22 in the BEC hole 21 at a predetermined position. The blockage-evaluation-value calculating step (Step S17) is identical to the blockage-evaluation-value calculating step (Step S13) described above, and thus explanations thereof will be omitted.

(Estimated-Blockage-Rate Calculating Step: Step S18)

An estimated blockage rate of the gaps 22 in the BEC hole 21 at each position (address) is calculated based on the blockage evaluation value acquired at the blockage-evaluation-value calculating step (Step S17) and the updated evaluation curve (Step S18). The estimated-blockage-rate calculating step (Step S18) is identical to the estimated-blockage-rate calculating step (Step S14) described above, and thus explanations thereof will be omitted.

(Blockage-Tendency Assessing Step: Step S19)

A blocked state of the gaps 22 in the BEC hole 21 at each position (address) is assessed based on the calculated estimated blockage rate (Step S19). The blockage-tendency assessing step (Step S19) is identical to the blockage-tendency assessing step (Step S15) described above, and thus explanations thereof will be omitted.

As described above, according to the present embodiment, when the estimated blockage rate of the gaps 22 is newly evaluated, the evaluation curve can be updated in advance to that close to the latest state by adding the interpolated information that can be obtained with less labor in a short period of time based on the evaluation curve, and then the estimated blockage rate of the gaps 22 in the BEC hole 21 to be inspected can be calculated, without re-creating an evaluation curve by performing large-scale visual inspection as in the conventional manner, even if the evaluation curve acquired at the time of evaluating the estimated blockage rate of the gaps 22 in the previous inspections varies due to aging. By reducing the process required for obtaining data for updating the evaluation curve, the blockage rate of the gaps 22 in the BEC hole 21 of the steam generator 10 can be evaluated easily with less labor. Therefore, the cost required for blockage evaluation of the gaps 22 in the BEC hole 21 can be reduced, and the frequency of the blockage evaluation can be increased. As a result, the blocked state of the steam generator 10 can be assessed more accurately, and cleaning of the steam generator 10 can be performed at a more appropriate timing. Accordingly, the operation efficiency of a nuclear power plant can be improved.

Furthermore, according to the present embodiment, when the respective tube support plates 17A to 17G are displayed in a three-dimensional diagram, the cross-sections of the respective tube support plates 17A to 17G are serially arranged so that the respective tube support plates 17A to 17G do not overlap on each other, and are displayed in the elliptical diagram with the ratio between the long axis and the short axis of the BEC hole 21 being within the predetermined range, and the tube support plates 17A to 17G are color-coded and displayed according to the estimated blockage rate of the BEC hole 21 in the respective tube support plates 17A to 17G. Accordingly, an intuitive image becomes similar to the actual installation state of the steam generator, thereby enabling to easily assess the blocked state in the cross-sections of the respective tube support plates 17A to 17G simultaneously, thereby enabling to easily assess the overall situation of the steam generator 10.

In the present embodiment, there has been explained a case of evaluating the blockage rate of the gaps 22, through which the heat transfer tube 12 is inserted, in the tube support plates 17A to 17G of the steam generator applied to a nuclear power plant. However, the present embodiment is not limited thereto, and can be also used for evaluating the blockage rate of an insertion hole in a tube support plate used for supporting a heat transfer tube to be used in a heat exchanger.

REFERENCE SIGNS LIST

10 steam generator
11 barrel
11a upper barrel
11b lower barrel
12 heat transfer tube
13 steam-water separator
14 moisture separator
15 external tube-bundle cylinder
16 tube plate
17A to 17G tube support plate
21 BEC hole
22 gap
25 hand hole
27 water chamber
30 partition plate
31 entrance chamber
32 exit chamber
33 inlet nozzle
34 outlet nozzle
35 primary cooling material (water)
37 secondary cooling material (water)
38 water feeding pipe
41 steam discharge port
42 water feeding channel
43 inspection device
50 processing device
51 control unit
52 recording unit
53 display unit
54 input unit
55 output unit
61 inspection processing program
62 evaluation-curve creating program
63 evaluation-curve updating program
64 blockage-evaluation-value calculating program 65 estimated-blockage-rate calculating program
66 blocked-state assessing program
66-1 average-blockage-rate calculating program
66-2 blocked-state imaging program

The invention claimed is:

1. An insertion-hole blockage-rate evaluation system being applied to a heat exchanger that includes a heat transfer tube and a plurality of tube support plates, each of the plurality of tube support plates having an insertion hole for inserting the heat transfer tube, with the insertion hole having a plurality of gaps formed in a circumferential direction of the heat transfer tube when the heat transfer tube is inserted through the insertion hole into the tube support plate, the insertion-hole blockage-rate evaluation system comprising:
an inspection device for performing a visual inspection of the gaps;
an inspection means that acquires blockage evaluation values for the gaps;
a processing device including a control unit; and
the control unit being configured to:
with a visual inspection by the inspection device, acquire blockage-rates of the plurality of gaps for the plurality of tube support plates;
acquire the blockage evaluation values of the plurality of gaps for the plurality of tube support plates based on eddy current waveforms thereof;
with a relation between each of the blockage-rates for the plurality of tube support plates and each of the blockage evaluation values for the plurality of tube support plates corresponding to the visual inspection positions, create a base evaluation curve;
from the base evaluation curve, calculate estimated blockage rates of the gaps;
display elliptical diagrams for the plurality of tube support plates in a three dimensional manner, each elliptical diagram having a ratio between a long axis and a short axis of each of the tube support plates in a range from 1.0 to 2.0 inclusive;
serially arrange the elliptical diagrams for the plurality of tube support plates so as not to overlap on each other; and
perform an imaging process to color-code each of the elliptical diagrams for the plurality of tube support plates according to the estimated blockage rates of the gaps and to display the color-coded elliptical diagrams.

2. The insertion-hole blockage-rate evaluation system according to claim 1, wherein the imaging process uses a mean value of an estimated blockage rate of at least one of the gaps positioned near the gaps as a value of the estimated blockage rate of the gaps.

3. The insertion-hole blockage-rate evaluation system according to claim 1, wherein in the imaging process, when there is an omission in information of the estimated blockage rate of the gaps provided in the tube support plate, interpolation is performed by using the estimated blockage rate of the at least one gap positioned near the gaps having an omission.

4. The insertion-hole blockage-rate evaluation system according to claim 1, wherein in the imaging process, a predicted estimated blocking speed of the insertion hole is determined from a transition of the estimated blockage rate of the gaps determined by inspections hitherto.

5. The insertion-hole blockage-rate evaluation system according to claim 4, wherein the blockage rate of the gaps predicted based on the estimated blocking speed and an operation time until an arbitrary inspection time is added to an estimated blockage rate of the gaps this time, thereby determining an estimated blockage rate of the gaps at the arbitrary inspection time.

6. An insertion-hole blockage-rate evaluation method being applied to a heat exchanger that includes a heat transfer tube and a plurality of tube support plates, each tube support plate having an insertion hole for inserting the heat transfer tube, with the insertion hole having a plurality of gaps formed in a circumferential direction of the heat transfer tubes when the heat transfer tube is inserted through the insertion hole into the tube support plate, the insertion-hole blockage-rate evaluation method comprising:
performing a visual inspection of the gaps;
acquiring blockage evaluation values for the gaps;
with the visual inspection, acquiring blockage-rates of the plurality of gaps for the plurality of tube support plates;
acquiring the blockage evaluation values of the plurality of gaps for the plurality of tube support plates based on eddy current waveforms thereof;
with a relation between each of the blockage-rates for the plurality of tube support plates and each of the blockage evaluation values for the plurality of tube support plates corresponding to the visual inspection positions, creating a base evaluation curve;
from the base evaluation curve, calculating estimated blockage rates of the gaps;
displaying elliptical diagrams for the plurality of tube support plates in a three dimensional manner, each elliptical diagram having a ratio between a long axis and a short axis of each of the tube support plates in a range from 1.0 to 2.0 inclusive;
serially arrange the elliptical diagrams for the plurality of tube support plates so as not to overlap on each other; and
performing an imaging process to color-code each of the elliptical diagrams for the plurality of tube support plates according to the estimated blockage rates of the gaps and displaying the color-coded elliptical diagrams.

7. The insertion-hole blockage-rate evaluation method according to claim 6, wherein the imaging process uses a mean value of an estimated blockage rate of at least one of the gaps positioned near the gaps as a value of the estimated blockage rate of the gaps.

8. The insertion-hole blockage-rate evaluation method according to claim 6, wherein in the imaging process, when there is an omission in information of the estimated blockage rate of the gaps provided in the tube support plate, interpolation is performed by using the estimated blockage rate of the at least one gap positioned near the gaps having an omission.

9. The insertion-hole blockage-rate evaluation method according to claim 6, wherein in the imaging process, a predicted estimated blocking speed of the insertion hole is determined from a transition of the estimated blockage rate determined by inspections hitherto.

10. The insertion-hole blockage-rate evaluation method according to claim 9, wherein the blockage rate of the gaps predicted based on the estimated blocking speed and an operation time until an arbitrary inspection time is added to an estimated blockage rate of the gaps this time, thereby determining an estimated blockage rate of the gaps at the arbitrary inspection time.

11. A non-transitory computer readable medium storing an insertion-hole blockage-rate evaluation program including instructions for executing the insertion-hole blockage-rate evaluation method according to claim 6.

* * * * *